(12) United States Patent
Abdel Shahid et al.

(10) Patent No.: US 10,624,114 B2
(45) Date of Patent: Apr. 14, 2020

(54) CONTROLLING UPLINK DATA TRANSMISSION IN NETWORK

(71) Applicant: T-Mobile USA, Inc., Bellevue, WA (US)

(72) Inventors: Wafik Abdel Shahid, Kenmore, WA (US); Ming Shan Kwok, Seattle, WA (US); Wei-Ming Lan, Morrisville, NC (US); Yasmin Karimli, Kirkland, WA (US); Thomas P. Lucht, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/260,347

(22) Filed: Jan. 29, 2019

(65) Prior Publication Data
US 2020/0045720 A1     Feb. 6, 2020

Related U.S. Application Data

(60) Provisional application No. 62/714,523, filed on Aug. 3, 2018.

(51) Int. Cl.
*H04W 72/04* (2009.01)
*H04W 88/06* (2009.01)
(Continued)

(52) U.S. Cl.
CPC ... *H04W 72/1268* (2013.01); *H04W 72/1215* (2013.01); *H04W 72/14* (2013.01); *H04W 88/06* (2013.01)

(58) Field of Classification Search
CPC ............. H04W 88/06; H04W 72/1215; H04W 72/0406; H04W 72/1294; H04W 72/14; H04W 72/1247
See application file for complete search history.

(56) References Cited

U.S. PATENT DOCUMENTS 10,367,677 B2 * 7/2019 Parkvall ............... H04B 7/0617
10,485,000 B2 * 11/2019 Shaheen ........... H04W 36/0022
(Continued)

OTHER PUBLICATIONS

3GPP TR 37.863-01-01 V15.0.0, 3rd Generation Partnership Project; Technical Specification Group Radio Access Network; E-UTRA, Jun. 2018, pp. 1, 3, 16-25, and 274-277.
(Continued)

*Primary Examiner* — Ahmed Elallam
(74) *Attorney, Agent, or Firm* — Lee & Hayes, P.C.

(57) ABSTRACT

A telecommunication terminal can include a memory storing conflict data. The terminal can receive an uplink (UL) grant record associated with a time of permitted UL transmission, and two downlink (DL) grant records, each indicating a respective frequency and associated with a respective time. The terminal can determine that the times of DL transmission at least partly overlap with the time of UL transmission. The terminal can determine, based on the conflict data, that the frequencies of DL transmission are associated with an inter-band conflict. In response, the terminal can transmit UL data at a time later than the time of permitted UL transmission. In some examples, the terminal can receive two DL grant records, make a determination that a frequency combination of two granted DL frequencies is within a predetermine frequency range, and, in response, transmit the UL data at a time different from a DL transmission time.

20 Claims, 8 Drawing Sheets

(51) Int. Cl.
*H04W 72/12* (2009.01)
*H04W 72/14* (2009.01)
*H04W 72/06* (2009.01)

(56) References Cited

U.S. PATENT DOCUMENTS

| | | | |
|---|---|---|---|
| 10,485,048 B2* | 11/2019 | Zeng | H04W 72/0453 |
| 2014/0064160 A1 | 3/2014 | Verger et al. | |
| 2017/0034850 A1 | 2/2017 | Rico Alvarino et al. | |
| 2017/0134880 A1 | 5/2017 | Rico Alvarino et al. | |
| 2017/0238314 A1 | 8/2017 | Zhang et al. | |
| 2018/0020408 A1 | 1/2018 | Zhang et al. | |
| 2018/0302895 A1* | 10/2018 | Akkarakaran | H04L 5/0094 |
| 2018/0367230 A1* | 12/2018 | Su | H04J 1/08 |
| 2018/0368153 A1* | 12/2018 | Li | H04W 72/12 |
| 2019/0223002 A1* | 7/2019 | Novlan | H04W 8/22 |
| 2019/0230690 A1* | 7/2019 | Akkarakaran | H04L 5/0046 |
| 2019/0239196 A1* | 8/2019 | Lee | H04L 1/1864 |
| 2019/0349848 A1* | 11/2019 | Bali | H04Q 11/02 |
| 2019/0380135 A1* | 12/2019 | Kwok | H04W 72/1257 |
| 2019/0394822 A1* | 12/2019 | Hosseini | H04W 72/14 |

OTHER PUBLICATIONS

3GPP TR 38.801 V14.0.0, "3rd Generation Partnership Project; Technical Specification Group Radio Access Network; Study on new radio access technolgy; Radio Access architecture and interfaces", Mar. 2017, pp. 3-6 and 9-15.

3GPP TS 37.340 V15.2.0, 3rd Generation Partnership Project; Technical Specification Group Radio Access Network; Evolved Universal Terrestrial Radio Access (E-UTRA) and NR; Multi-connectivity; Stage 2, Jun. 2018, pp. 3-4 and 6-14.

"5G NR A New Era for Enhanced Mobile Broadband", Mediatek, Mar. 2018. retrieved Sep. 11, 2018 from «https://cdn-www.mediatek.com/page/MediaTek-5G-NR-White-Paper-PDF5GNRWP.pdf», 35 pages.

"Adjacent Channel Leakage Ratio (ACLR) Derivation for General RR Devices" retrieved Aug. 1, 2018 from «https://www.maximintegrated.com/en/app-notes/index.mvp/id/3902», Sep. 14, 2016, 5 pages.

"DCI", ShareTechnote, 2017, retrieved Sep. 11, 2018, from «http:www.sharetechnote.com/html/DCI.html», pp. 1-7.

Demmer, D., et al., "Analytical Study of 5G NR eMBB Co-Existence", May 15, 2018, 5 pages.

Ericsson, T-Mobile USA, "TP for TR 37.863-01-01 DC_71A-n71A", Oct. 9-13, 2017, 8 pages.

ETSI TS 136 104 V15.3.0, "LTE; Evolved Universal Terrestrial Radio Access (E-UTRA); Base Station (BS) radio transmission and reception", Jul. 2018, pp. 70-71, 124-126, 179-193, and 268.

ETSI TS 136 211 V14.6.0. "LTE; Evolved Universal Terrestrial Radio Access (E-UTRA); Physical Channels and Modulation", Apr. 2018, pp. 79-81.

ETSI TS 136 212 V13.4.0, "LTE; Evolved Universal Terrestrial Radio Access (E-UTRA); Multiplexing and Channel Coding", Jan. 2017, pp. 103-133.

ETSI TS 136 213 V133.0, "LTE; Evolved Universal Terrestrial Radio Access (E-UTRA); Physical Layer Procedures", Nov. 2016, pp. 1, 50-58, 62-68, and 202-213.

ETSI TS 136 321 V145.0, "LTE; Evolved Universal Terrestrial Radio Access (E-UTRA); Medium Access Control (MAC) Protocol Specification", Jan. 2018, pp. 1-22, 41-44.

ETSI TS 138 101-1 V15.2.0, "5G; NR; User Equipment (UE) Radio Transmission and Reception; Part 1: Range 1 Standalone", Jul. 2018, pp. 1, 3-17, 27-28, 69-72, 74-88, 92, 95, 98, 123-126.

ETSI TS 138 101-3 V15.2.0, "5G; NR; User Equipment (UE) Radio Transmission and Reception; Part 3: Range 1 and Range 2 Interworking Operation with Other Radios", Jul. 2018, pp. 3-6, 11, 12, 148-151, and 180.

ETSI TS 138 211 V15.2.0, "5G; NR; Physical Channels and Modulation", Jul. 2018, pp. 1, 3-6, 7-14.

Holma H., and A. Toskala, "LTE for UMTS: Evolution to LTE-Advanced", Mar. 16, 2011, Chapter 16, 8 pages.

"Intermodulation", Wikipedia, retrieved Aug. 1, 2018 from «https://en.wikipedia.org/w/index.php? title=Intermodulation&oldid=848793288», Jul. 4, 2018, 6 pages.

The Relationship Between Adjacent Channel Power Ratio and IMD3 in LTE, Oct. 9, 2013, retrieved Aug. 3, 2018 from «http://www.nutaq.com/blog/relationship-between-adjacent-channel-power-ration-and-imd3-lte», 2 pages.

PCT Search Report and Written Opinion dated Nov. 18, 2019, for PCT Application No. PCT/US2019/042968 9 pages.

\* cited by examiner

CONTROLLING UPLINK DATA TRANSMISSION IN NETWORK

CROSS-REFERENCE TO RELATED APPLICATIONS

This application is a nonprovisional application of, and claims priority to and the benefit of, U.S. Patent Application Ser. No. 62/714,523, filed Aug. 3, 2018, and entitled "Intermodulation-Distortion Mitigation," the entirety of which is incorporated herein by reference.

BACKGROUND

Cellular communication devices use network radio access technologies to communicate wirelessly with geographically distributed cellular base stations. Long-Term Evolution (LTE) is an example of a widely implemented radio access technology that is used in $4^{th}$ Generation (4G) communication systems. New Radio (NR) is a newer radio access technology that is used in $5^{th}$ Generation (5G) communication systems. Standards for LTE and NR radio access technologies have been developed by the Third-Generation Partnership Project (3GPP) for use by wireless communication carriers. There are several proposed configurations for 4G/5G dual connectivity, and communications between network components may be implemented in various ways.

A communication protocol defined by the 3GPP, referred to as EN-DC (E-UTRAN/New Radio-Dual Connectivity) enables the simultaneous use of LTE and NR radio access technologies for communications between a mobile device and a cellular communications network. EN-DC may also be referred to as LTE/NR dual connectivity. EN-DC is described by 3GPP Technical Specification (TS) 37.340 and others.

EN-DC can be implemented in conjunction with a 4G core network, with the support of 5G base stations, in a configuration known as Non-Standalone Architecture (NSA). In this configuration, a 4G LTE base station (referred to as a Master eNodeB or MeNB) is associated with a 5G NR base station (referred to as a Secondary gNodeB or SgNB). In an NSA system, both the LTE base station and the NR base station exchange data via a 4G core network. However, control communications are between the 4G core network and the LTE base station, and the LTE base station is configured to communicate with and to control the NR base station. In an NSA system, a mobile device initially connects to an LTE base station.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be, in at least one example, included in the first component or operation.

DETAILED DESCRIPTION

Overview

Figure 1:
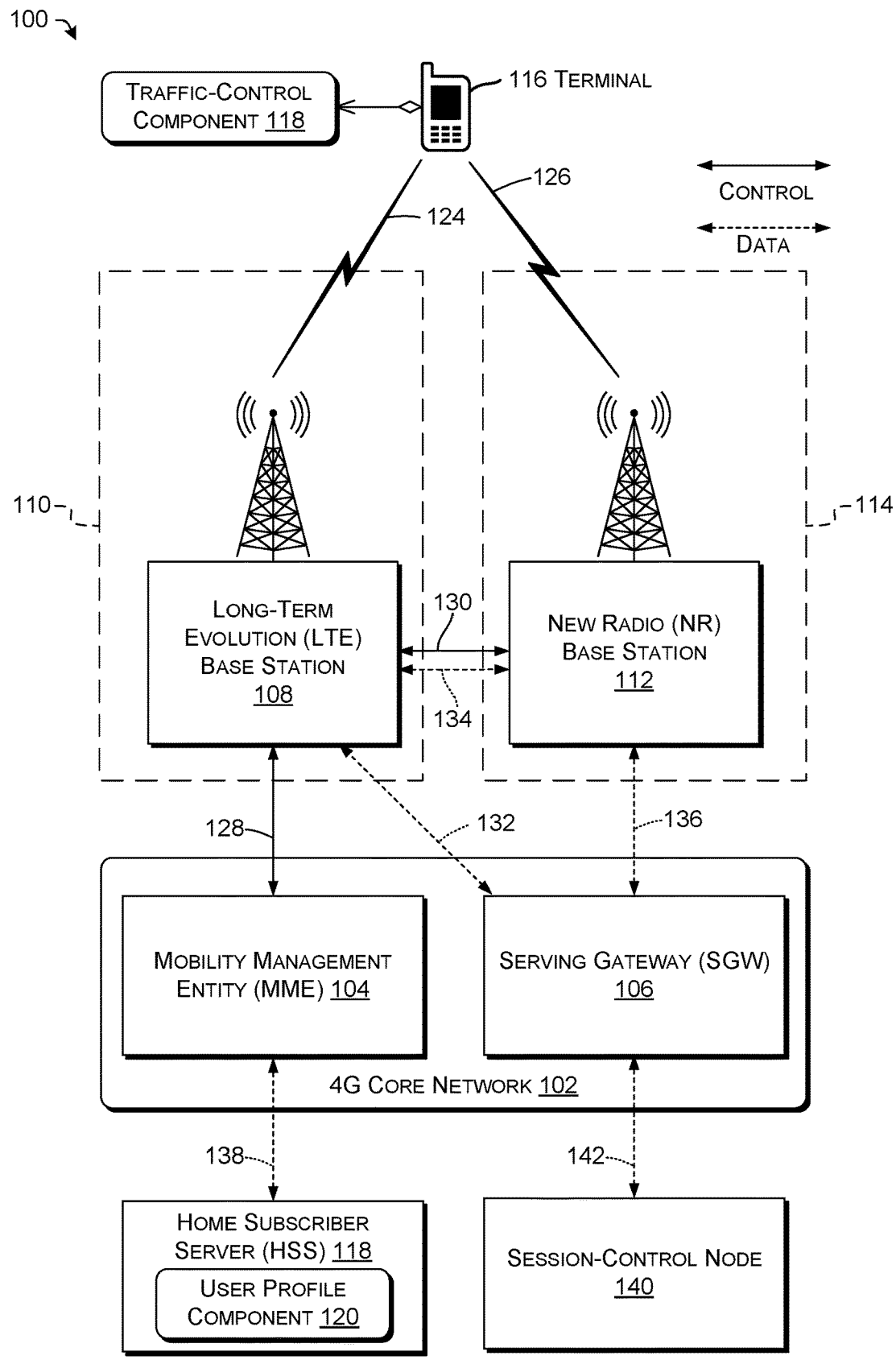
FIG. 1 illustrates an example telecommunication system including user equipment and supporting dual connectivity.

Various example systems, devices, and techniques described herein are directed to management of uplink traffic to reduce negative effects of intermodulation distortion (IMD) or other RF effects on latency-sensitive traffic. In some instances, a master base station (e.g., an LTE base station) may operate in conjunction with a secondary base station (e.g., an NR base station) to provide dual connectivity to a terminal, such as user equipment (UE), operating in an environment. The terminal can control its uplink traffic to mitigate negative effects due to 1 MB.

Concurrent downlink transmissions on two different frequencies can give rise to IMD products, e.g., due to transmitter or receiver nonlinearities and consequent mixing. These IMD products can exist over the air or in circuitry at the terminal or a base station; the effects are similar in any of those situations. In Band 71/n71 dual LTE/NR connectivity and other situations in which different bands are close together, 1 MB products from one band can interfere with signals in the other band. Accordingly, in some examples, when the downlink (DL) grants to a terminal indicate such a problematic situation will occur, the terminal can refrain from sending a UL scheduling request, or disregard an existing UL grant, that overlaps in time with those DL grants. In some examples, the terminal can refrain or disregard only with respect to NR UL traffic. In some examples, the terminal can continue to send LTE UL traffic to preserve call quality for Voice-over-LTE (VoLTE) calls or other latency-sensitive traffic.

For example, a terminal operating in EN-DC NSA mode connected to LTE/NR simultaneously may experience high IMD if the operating frequencies for both Radio Access Technologies (RATs) fall in the same band, such as the EN-DC DC_(n)71B configuration. For example, allocations of PRBs that are spaced apart in frequency can cause 3rd-order (IMD3) or 5th-order (IMD5) frequency components of one RAT to fall in the other RAT's portion of the band. For example, the farther apart two granted PRBs are in the frequency domain, the more their 1 MB products will spread across adjacent spectrum. In an example of a 10 MHz spectrum block, when NR DL traffic is transmitted at the bottom (f0) and top (f1) ends of an upper 5 MHz half-block (e.g., NR), the IMD3 term 2*f0-f1 will be about 5 MHz lower than f0. Energy at this IMD3 frequency therefore will fall in the lower 5 MHz half-block (e.g., LTE).

High IMD can increase the Maximum Sensitivity Degradation (MSD), which can in turn cause an UL Scheduling Request (SR) to be dropped due to high interference on the UL. Accordingly, various examples prioritize UL SRs for VoLTE traffic or other latency-sensitive traffic compared to SRs for non-real-time (e.g., non-GBR) packets. Various examples monitor the MSD each transmission time interval (TTI) or other time interval, or determine an expected MSD based on a PRB allocation for a TTI using, e.g., the tables below. High MSD is correlated with inter-band conflicts, in some examples. In various examples, LTE VoLTE UL traffic is prioritized (e.g., by refraining from sending NR UL traffic) if there is a possible UL packet loss based on the MSD (e.g., an MSD suggesting a desense in the TX branches). In various examples, VoLTE downlink traffic is prioritized over non-GBR packets being carried over NR.

VoLTE traffic prioritization can reduce VoLTE call drops and improve user experience, e.g., when the terminal is operating in the EN-DC DC (n)71B frequency band, or similar dual-connectivity band configurations. Accordingly, example systems, devices, and techniques described herein can improve a functioning of a network by reducing packet loss due to IMD, or by giving GBR or other latency-sensitive traffic priority over non-GBR or other traffic that is less sensitive to latency.

Various examples herein are given in the context of Band 71 (B71), although this is not limiting. For example, DC_(n)71 dual connectivity involves LTE communications in band 71 and NR connections in band n71. B71/n71 can use 5, 10, 15, or 20 MHz channels or sub-bands, e.g., 10 MHz for each of LTE and NR, or 5 MHz for each of LTE and NR. The sub-bands can be divided in the same way in both UL and DL, e.g., a 5 MHz UL sub-band and a 5 MHz DL sub-band for LTE, and a 15 MHz UL sub-band and a 15 MHz DL sub-band for NR. Table 1 shows the frequencies of LTE B71 per 3GPP R4-1708808 and NR n71 per 3GPP TS 38.101-1 v15.2.0.

TABLE 1

| Band | Uplink | Downlink | Duplex |
|---|---|---|---|
| 71, n71 | 663 MHz-698 MHz | 617 MHz-652 MHz | FDD |

The terms "session" and "communication session" as used herein include a communications path for bidirectional exchange of data among two or more computing devices, referred to for brevity as "terminals." Example sessions include voice and video calls, e.g., by which human beings converse; data communication sessions, e.g., between two electronic systems or between an electronic system and a user-interface device in use by a human being; or a Rich Communication Suite (RCS) session. Some examples herein relate to low-latency traffic carried in a session. Some examples herein relate to traffic other than audio or video traffic. Sessions can be carried, e.g., by cellular or data networks, e.g., LTE or IEEE 802.11 (WIFI). Other examples of networks are discussed below.

Terminals can include, e.g., wireless or wired voice- or data-communication devices. A terminal can be a device that includes a user interface (e.g., as does a smartphone), or can be a device that does not include a user interface. For example, a streaming server configured to provide audio or visual content on demand can be a terminal. Such a terminal may not include a user interface, and may instead respond to other terminals that form queries and send those queries to the server in response to actions taken via interfaces at those other terminals. A terminal can be, e.g., a cellular phone, smartphone, tablet computer, personal digital assistant (PDA), personal computer (PC), laptop computer, media center, work station, etc.

Subsection headers in this Detailed Description are solely for convenience in reading. No limitations are implied by the presence or arrangement of the subsection headers, or by the separation of features between those subsections. Some examples include features from only one subsection. Some examples include features from more than one subsection.

As used herein, the term "unique identifier" and similar terms encompass both truly unique identifiers (e.g., Ethernet MAC addresses that are unique by construction, or Version N21 UUIDs) and identifiers with a negligible probability of collision (non-uniqueness) (e.g., SHA256 hashes of data uniquely identifying an object, or Version 4 UUIDs).

As used herein, a "random" value can be a truly random value, e.g., measured from physical phenomena, or a pseudorandom value. Examples of random values include cryptographically-strong random numbers.

Illustrative Telecommunications Networks and Components

FIG. 1 illustrates an example telecommunications network 100 (or other telecommunication system) including user equipment and various components as described herein, and shows an overview of nodes and devices involved in control of uplink data transmission. The components shown in FIG. 1 may be used to implement dual connectivity, for use in an NSA (non-standalone) configuration. When using NSA, a terminal or other communication device may use both an LTE carrier and an NR carrier for uplink and downlink transmissions to and from respective LTE and NR base stations. The LTE carrier can be used for control-plane messaging and for user-plane communications. The NR carrier can be used for additional user-plane bandwidth.

For purposes of discussion, a 4G or LTE component is a component that performs according to 4G or LTE communications standards. A 4G or LTE signal or communication is a signal or communication that accords or complies with 4G or LTE communications standards. A 5G or NR component is a component that performs according to 5G or NR communications standards. A 5G or NR signal or communication is a signal or communication that accords or complies with 5G or NR communications standards.

The network 100 includes a 4G core network 102. The 4G core network 102 can include, among other components, a Mobility Management Entity (MME) 104 and a Serving Gateway (SGW) 106. The MME 104 and the SGW 106 may be implemented in accordance with 3GPP 4G specifications. FIG. 1 also shows a 4G LTE base station (BS) 108 of an LTE access network 110, a 5G NR base station 112 of an NR access network 114, and terminal 116 (e.g., cellular UE). The terminal 116 may be referred to in the following discussion as a cellular communication device or as a device. Although only one terminal 116 is shown, network 100 can include multiple terminals 116.

The MME 104 and/or the 4G core network 102 can be communicatively coupled with a home subscriber server (HSS) 118, which can include a user profile component 120. The terminal 116 can include a traffic-control component 122 to control uplink traffic as discussed herein.

Control plane communication channels between and among the base stations 108, 112 and the components of the 4G core network (and additional components) are shown as solid lines. Data plane communication channels between the base stations 108, 112 and the components of the 4G core network are shown as dashed lines. Wireless communications between the terminal 116 and the base stations 108, 112 (access networks 110, 114, respectively) are shown as lightning bolt symbols.

The LTE base station 108 and the NR base station 112 may in some cases be associated with each other by being co-located at a single cell site. Although only a single pair of base stations is shown in FIG. 1, the network 100 may include multiple cell sites, some of which might have both an LTE base station and an NR base station. In some instances, at least a portion of a geographic coverage area associated with the LTE base station 108 can overlap with a geographic coverage area associated with the NR base station 112.

The MME 104 functions as a control node for the 4G core network 102. For example, the MME 104 may facilitate idle mode, bearer activation and deactivation, SGW selection, user authentication, and the like. In practice, a 4G core network may have multiple MMES 104.

The SGW 106 functions as a communication gateway of the 4G core network 102. The SGW 106 provides a data plane interface with the LTE BS 108 and the NR BS 112. A 4G core network may have multiple SGWs 106.

The HSS 118 functions as remote computing device that includes user profile information, represented as or accessed by the user profile component 120. In some cases, the HSS 118 may facilitate user authentication and access authorization. The HSS 118 can provide user profile information to the MME 104 (and subsequently to the LTE base station 108) in response to a registration request and/or a request to initiate a communication.

The LTE base station 108 is configured in accordance with 4G LTE standards to communicate with devices using the LTE radio access technology. The NR base station 112 is configured in accordance with 5G NR standards to communicate with devices using NR radio access technology. An LTE base station is often referred to as, or can include, an eNodeB. An NR base station is often referred to as, or can include, a gNodeB.

The terminal 116 may be one of many such devices that are configured for use within the network 100. The terminal 116 may comprise any of various types of cellular communication devices that are capable of wireless data and/or voice communications, including smartphones and other mobile devices, "Internet-of-Things" (IoT) devices, smart home devices, computers, wearable devices, entertainment devices, industrial control equipment, etc. In certain environments, the terminal 116 may be referred to as a computing device, a cellular communications device, or a mobile station (MS).

During a data communication session, the terminal 116 can establish a primary LTE data connection 124 with the LTE base station 108 and a secondary NR data connection 126 with the NR base station 112. The primary LTE data connection 124 is a wireless communication channel that uses LTE radio access technology. The secondary NR data connection 126 is a wireless communication channel that uses NR radio access technology.

The network 100 can use a first control-plane communication channel 128 between the MME 104 and the LTE base station 108, and a second control-plane communication channel 130 between the LTE base station 108 and the NR base station 112. The network 100 can use a first data-plane communication channel 132 between the SGW 106 and the LTE base station 108, and a second data-plane communication channel 134 between the LTE base station 108 and the NR base station 112. Some implementations may also have a third data-plane communication channel 136 between the SGW 106 and the NR base station 112. In some examples, the network 100 can use a fourth data-plane communication channel 138 between the MME 104 (or the 4G Core Network 102, generally) and the HSS 118.

In some examples, the terminal 116 can communicate with the LTE base station 108 and the NR base station 112 simultaneously for a single session or for multiple sessions. For example, in some instances, uplink data or downlink data can be scheduled independently by the LTE base station 108 and the NR base station 112. Further, in some examples, a first communication (e.g., a voice session) of the terminal 116 can be handled by the LTE base station 108, e.g., as a VoLTE call. At least partly concurrently, a second communication (e.g., a data session such as for Web browsing or email) can be handled by the NR base station 112. Of course, the examples are illustrative and are not intended to be limiting.

Although the terminal 116 is described as communicating through a single cell site using both LTE and NR communications, it may be that in certain situations the LTE communications are through an LTE base station 108 of a first cell site and the NR communications are through an NR base station 112 of another cell site.

As may be understood, the network 100 may be implemented in accordance with any one of Option 3, 3a, 3x, 4, 4a, 7, 7a, and/or 7x, as defined by 3GPP. For example, the network 100 may include a 5G core and/or may include additional data-plane or control-plane signaling. In general, the techniques discussed herein may be implemented in any dual connectivity or multi connectivity environment.

Terminals 116 can be configured to initiate or receive communication sessions, such as a voice call, a video call, or another sort of synchronous communication. Initiation of such communications may involve communication clients and Session Initiation Protocol (SIP, RFC 3261) clients communicatively connected with components of the telecommunications network 100, e.g., session-control node 140. Session-control node 140 can exchange data via fifth data-plane communication channel 142 with SGW 106. Session-control node 140 can be part of an applications network, e.g., an IMS network, the Internet or a subset thereof (e.g., a virtual private network, VPN), or another network providing services to terminal 116. The applications network can also be referred to as an "upper-level" network that uses the services provided by access networks 110, 114 to communicate with terminals 116. Network 100 can include or be connected with any number of access networks or any number of applications networks. In various embodiments, the session-control node 140 represents component(s) of an IMS core network.

Control data, such as signaling messages, can be carried over dedicated signaling links (e.g., a Signaling System 7, SS7, link) or as flows of signaling data across a link shared with non-signaling traffic (e.g., ISUP over SIGTRAN, or non-ITU TCP/IP-family protocols such as SIP). SIP can be used to establish and manage communication sessions. SIP is an IP-based protocol, so terminal 116 can exchange SIP messages with session-control node 140 via channel 142 carrying IP packets. Session-control node 140 can include, e.g., a proxy call session control function (P-CSCF) via which terminal 116 can access IMS services. Other signaling protocols can be additionally or alternatively be used, e.g., over Web Real-Time Communication (WebRTC) links. In some examples, session-control node 140 can include an H.323 multipoint control unit, and terminal 116 can exchange H.225.0 signaling messages with session-control node 140 via channel 142, e.g., for multimedia conferencing.

In some examples, session-control node 140 provides voice-calling, video-calling, or data services. Session-control node 140 can provide different QoS levels to different services. In some examples, QoS levels are identified by LTE QoS Class Identifiers (QCIs). QCIs can be used to define QoS for individual bearers. Each QCI defines particular latency, packet priority, and packet-loss rate requirements. For example, an IMS core can provide VoLTE data-transport services at QCI 1, video-over-LTE (ViLTE) video data-transport services at QCI 2, IMS signaling at QCI 5, and non-GBR packet data at QCI 6.

As used herein, a message "sent to," "transmitted to," or "transmitted toward" a destination, or similar terms, can be sent directly to the destination, or can be sent via one or more intermediate network nodes or devices to the destination. Those intermediate network nodes or devices can include routing device(s) such as SGW 106. Similarly, a message "received from" a destination can be received directly from the destination, or can be received via one or more intermediate network nodes or devices from the destination. A message passing through one or more intermediate network nodes or devices can be modified by those network nodes or devices, e.g., by adding or removing framing, by changing routing information, or by changing a presentation of at least part of the message, e.g., from a SIP start-line to a SIP header or vice versa. As used herein, a "reply" message is synonymous with a "response" message. The term "reply" is used for clarity, e.g., when discussing reply messages sent in response to the receipt of messages.

Any of the illustrated components can be or include a server or server farm, multiple, distributed server farms, a mainframe, a work station, a PC, a laptop computer, a tablet computer, an embedded system, or any other sort of device or devices. In one implementation, one or more of these may represent a plurality of computing devices working in communication, such as a cloud-computing node cluster. Examples of computing components are described below with reference to FIG. 2.

Figure 2:
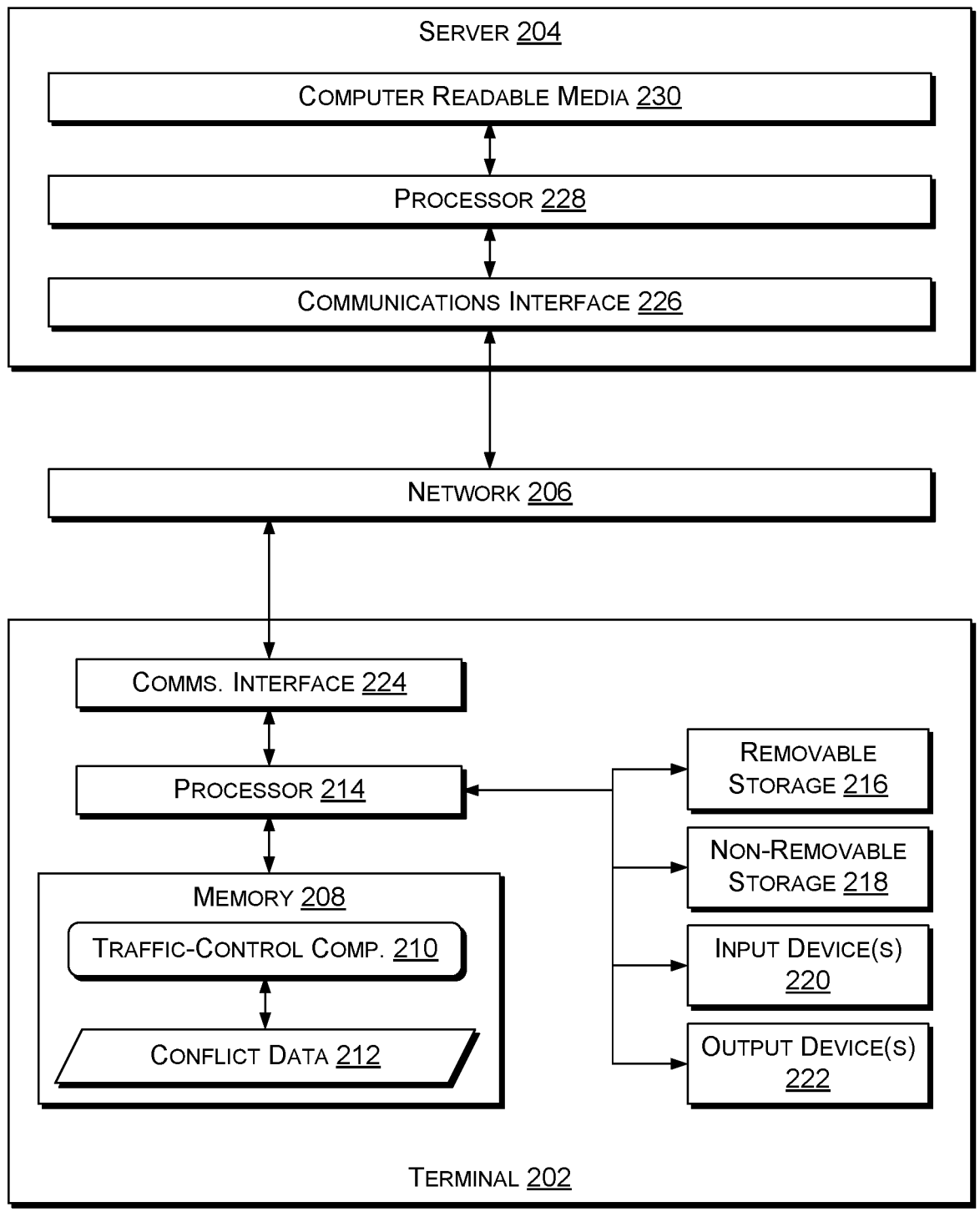
FIG. 2 is a block diagram illustrating components of a system that provides dual connectivity and uplink control according to some implementations.

FIG. 2 is a block diagram illustrating a system 200 permitting traffic control according to some implementations. The system 200 includes a terminal 202, which can correspond to or represent the terminal 116 of FIG. 1. It is to be understood in the context of this disclosure that the terminal 202 can be implemented as a single device or as a plurality of devices with components and data distributed among them. Terminal 202 is coupled to a server 204 via a network 206.

The server 204 can represent an LTE BS 108, NR BS 112, HSS 118, element of 4G core network 102, session-control node 140, or another control device or information server of a telecommunications network or system (e.g., network 100). The depicted network 206 can include or represent one or more networks, such as a cellular network and a data network. In some examples, network 206 may include any network configured to transport IP packets, e.g., IPv4, IPv6, or any future IP-based network technology or evolution of an existing IP-based network technology. For example, the network 206 can include one or more core network(s) (e.g., 4G core network 102) connected to terminal(s) via one or more access network(s) (e.g., access network 110, 114).

As illustrated, the terminal 202 comprises a memory 208 storing a traffic-control component 210 (which can represent component 122, FIG. 1). The traffic-control component 210 stored in the memory 208 can comprise methods, threads, processes, applications or any other sort of executable instructions. The traffic-control component 210 can also include files and databases. The traffic-control component 210 can include functionality to selectively delay transmission of uplink data via NR. Examples are discussed below.

Memory 208 can include conflict data 212, e.g., represented as a lookup table (LUT), database table, or other datastore. Conflict data 212 can include one or more conflict indications associated with pairs or other groups of multiple DL frequencies. Each conflict indication can indicate that the multiple DL frequencies associated with that indication are themselves associated with (e.g., may trigger or participate in) an inter-band conflict. Conflict data 212 can be provisioned in memory 208 during manufacturing of terminal 202, or otherwise before terminal 202 is placed into service by or on behalf of an end user. For example, conflict data 212 can indicate which combinations of DL frequencies are likely to cause IMD. In some examples, conflict data 212 indicates combinations of DL frequencies for which IMD products, e.g., IMD3 or IMD5, are likely to fall into a different (e.g., adjacent) band. Examples are discussed herein, e.g., with reference to FIGS. 3, 4, and 7, e.g., operation 322.

Terminal 202 can include one or more processor(s) 214 configured to execute instructions stored on memory 208. The memory 208 can be used to store data and to store instructions that are executable by the processors 214 to perform various functions as described herein. The memory 208 can store various types of instructions and data, such as an operating system, device drivers, etc. The processor-executable instructions can be executed by the processors 214 to perform the various functions described herein. In various embodiments, the memory 208 is volatile (such as random-access memory, RAM), non-volatile (such as ROM, flash memory, etc.), or some combination of the two.

Memory 208 can include at least one computer-readable medium (CRM), e.g., RAM, solid state drive(s) (SSDs), disk drives (e.g., platter-based hard drives), other types of computer-readable media, or any combination thereof. For example, the memory 208 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 214. Tangible computer-readable media can include volatile and nonvolatile, removable and non-removable media implemented in any method or technology for storage of information, such as computer readable instructions, data structures, program modules, or other data.

Terminal 202 can include at least one of, or all of, a removable storage 216 (e.g., a SIM card, SD card, or removable disk), a non-removable storage 218 (e.g., a Flash memory mounted to a circuit board within terminal 202), input device(s) 220, or output device(s) 222. In some examples, data described herein as being stored in memory 208 (e.g., conflict data 212) can additionally or alternatively be stored in at least one of removable storage 216 or non-removable storage 218. Input device(s) 220 can include a keypad, a cursor control, a touch-sensitive display, a haptic interface, a voice-input (e.g., speech-recognition) device, or other device(s) for receiving commands from the user, e.g., under control of processor(s) 214. Output device(s) 222 can include an electronic display device, a speaker, a printer, a vibration unit (e.g., haptic interface), a touchscreen, a printer, or other devices for presenting information to a user, e.g., under control of processor(s) 214.

The terminal 202 also includes additional data storage devices (removable and/or non-removable) such as, for example, magnetic disks, optical disks, or tape. Such additional storage is illustrated in FIG. 2 by removable storage 216 and non-removable storage 218. Tangible computer-readable media can include volatile and non-volatile, removable and non-removable media implemented in any method or technology for storage of information, such as computer readable instructions, data structures, program modules, or other data. The memory 208, the removable storage 216 and the non-removable storage 218 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the terminal 202. Any such tangible computer-readable media can be part of the terminal 202.

Processor(s) 214 can include, e.g., e.g., one or more processor devices such as central processing units (CPUs), microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). In some embodiments, the processor(s) 214 is a central processing unit (CPU), a graphics processing unit (GPU), or both CPU and GPU, or other processing unit or component known in the art. For brevity, processor 214 and, if required, memory 208, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. In some examples of control units including ASICs or other devices physically configured to perform operations described herein, a control unit does not include computer-readable media storing executable instructions. Other examples of control units can include processor 228 and, if required, CRM 230, discussed below. Accordingly, functions described as carried out by processor(s) 214 in response to instructions stored on a memory 208 can additionally or alternatively be performed by a control unit configured to perform functions described herein without reading instructions to do so from memory 208.

For brevity, discussions of functions performed "by" module(s) refer, in the context of processor-executable instructions, to functions performed in response to processor-executable instructions of the referred-to module(s). In the context of FPGAs or other control units not using processor-executable instructions, discussions of functions performed "by" module(s) refer to functions performed by the special-purpose logic or other configuration of those module(s).

The terminal 202 may be configured to communicate over a telecommunications network using any common wireless and/or wired network access technology. Moreover, the terminal 202 may be configured to run any compatible device operating system (OS), including but not limited to, MICROSOFT WINDOWS MOBILE, GOOGLE ANDROID, APPLE IOS, LINUX MOBILE, as well as any other common mobile device OS.

For example, terminal 202 can include one or more communications interface(s) 224 configured to selectively communicate (wired or wirelessly) via the network 206, e.g., via an access network or other cellular network, under control of the processor(s) 214. The communications interface(s) 224 can include one or more wired or wireless communications interface(s) 224 (e.g., transceiver(s)). For example, the communications interface(s) 224 can include a network interface card (NIC), a network adapter, a LAN adapter, or a physical, virtual, or logical address to connect to various networks, devices, or components illustrated in the network 100, for example. To increase throughput when exchanging wireless data, the communications interface(s) 224 can utilize multiple-input/multiple-output (MIMO) technology. The communications interface(s) 224 can comprise any sort of wireless communications interfaces capable of engaging in wireless, radio frequency (RF) communication. The communications interface(s) 224 can also include other wireless modems, such as a modem for engaging in Wi-Fi, WiMAX, Bluetooth, infrared communication, and the like.

In some examples, server 204 can communicate with (e.g., is communicatively connectable with) terminal 202 or other devices via one or more communications interface(s) 226, e.g., network transceivers for wired or wireless networks, or memory interfaces. Example communications interface(s) 226 can include ETHERNET or FIBRE CHANNEL transceivers, WIFI radios, or DDR memory-bus controllers (e.g., for DMA transfers to a network card installed in a physical server 204).

The server 204 can include one or more processors 228 and one or more CRM 230. The CRM 230 can be used to store processor-executable instructions that can be executed by the one or more processors 228 to perform various functions described herein, e.g., to receive uplink scheduling requests or determine uplink or downlink grants.

Telecommunications networks, such as network 206 or a component thereof (or network components of network 100), may include a core network operated by one or more service providers ("carriers"), such as one or more cellular-telephony providers. The core network is connected via access networks to terminals. Terminals can be operated by users ("subscribers"), or can be autonomous. Example access networks carrying traffic of sessions can include second-generation (2G), third-generation (3G), or fourth-generation (4G) cellular networks; wired data networks such as Ethernet, Asynchronous Transfer Mode (ATM), Public Switched Telephone Network (PSTN), Data Over Cable Service Interface Specification (DOCSIS), digital subscriber line (DSL), or optical networks (e.g., Synchronous Optical NETwork, SONET); or wireless data networks such as Institute of Electrical and Electronics Engineers (IEEE) 802.11 (WIFI), 802.15.1 (BLUETOOTH), or 802.16 (WI-MAX) networks carrying voice over Internet Protocol (VoIP) (e.g., VoWIFI) calls.

Some examples can include or be interoperable with Long Term Evolution (LTE) or 3GPP fifth-generation New Radio (5G NR) cellular networks carrying VoLTE sessions using Session Initiation Protocol (SIP) signaling. In some examples, the network 206 can provide wide-area wireless coverage using a technology such as GSM or other 2G cellular technologies; the Universal Mobile Telecommunications System (UMTS) or other 3G cellular technologies; or LTE or other 4G cellular technologies. Example cellular-network technologies can include Code Division Multiple Access (CDMA), Time Division Multiple Access (TDMA), Evolution Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), GSM/EDGE RAN (GERAN), Universal Terrestrial RAN (UTRAN), or evolved UMTS Terrestrial RAN (E UTRAN).

Illustrative Operations

Figure 3:
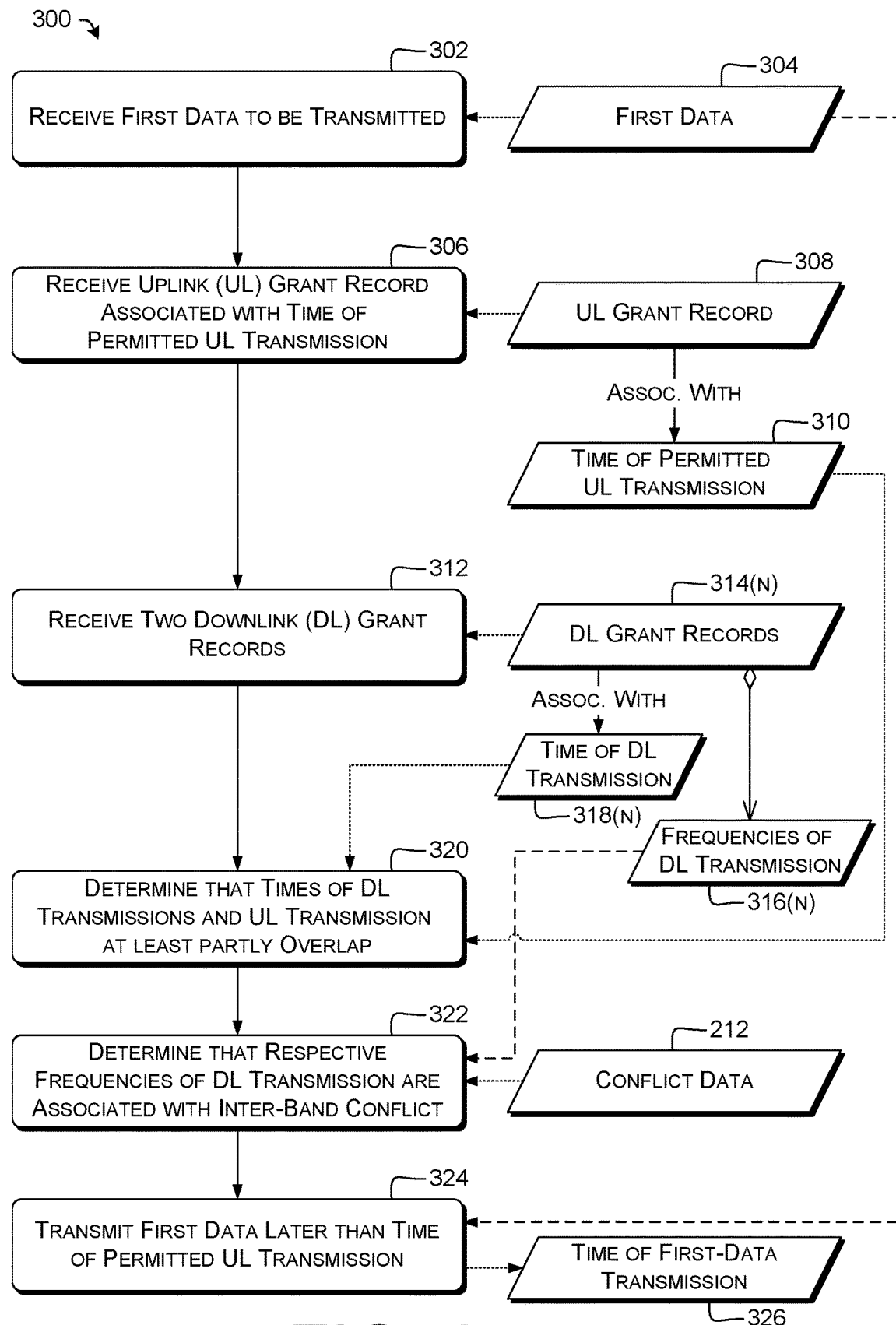
FIG. 3 illustrates an example process for controlling transmission of uplink data.

FIG. 3 is a dataflow diagram illustrating an example process 300 for traffic control, and related data items. For clarity, dataflow is shown using stippled or dashed lines. Process 300 can be performed, e.g., by a terminal 202 of a telecommunications system 200, e.g., including communications interface 224 and at least one processor 214. In some examples, the terminal 202 includes control unit(s) configured to perform operations described below, e.g., in response to computer program instructions of the traffic-control component 210.

Operations shown in FIG. 3 and in FIGS. 4-8, discussed below, can be performed in any order except when otherwise specified, or when data from an earlier step is used in a later step. For clarity of explanation, reference is herein made to various components shown in FIGS. 1-2 that can carry out or participate in the steps of the example methods. It should be noted, however, that other components can be used; that is, example method(s) shown in FIGS. 3-8 are not limited to being carried out by the identified components, and are not limited to including the identified operations or messages.

Various examples of FIGS. 3-8 can be carried out by or at telecommunication terminal 116, 202. The terminal 116, 202 can include a communications interface 224 configured to communicate with a cellular network (e.g., network 206 or a portion thereof), a memory 208 storing conflict data 212, and a control unit (e.g., including processor 214) communicatively connected with the communications interface 224 and the memory 208. In some examples, the communications interface 224 can be configured to communicate concurrently via a first access network and via a second access network. For example, the communications interface 224 can support EN-DC. The first access network can be, e.g., a Third-Generation Partnership Project New Radio (fifth-generation) access network. The second access network can be, e.g., a Long-Term Evolution (LTE) access network.

At 302, the control unit can receive first data 304 to be transmitted. In some examples, the control unit can receive the first data 304 from an application running on terminal 116, 202 via a communication subsystem, e.g., of a kernel or device driver. For example, the application can provide the first data 304 via an API call or local (e.g., UNIX-domain) socket transfer.

At 306, the control unit can receive, via the communications interface 224, an uplink (UL) grant record 308 associated with a time 310 of permitted UL transmission. For example, the control unit can perform a blind search on an LTE or NR Physical Downlink Control Channel (PDCCH) to locate record(s) intended for the terminal 116, 202 and using Downlink Control Information (DCI) Format 0, 4, 6-0A, or 6-0B (3GPP TS 36.212 v13.4.0 § 5.3.3.1.1, § 5.3.3.1.8, § 5.3.3.1.10, § 5.3.3.1.11; 3GPP TS 36.213 v13.3.0 § 8.1). The UL grant record 308 can be associated with the first access network, e.g., NR, in some examples.

In some examples, the time 310 of permitted UL transmission can be a time in a predetermined relationship to a time of transmission or receipt of the UL grant record 308. For example, some LTE configurations provide that an UL grant record 308 received in a particular subframe s permits UL transmissions during subframe s+4 in PRBs indicated in the UL grant record 308 (e.g., 3GPP 36.213 § 8.0). Additionally or alternatively, the UL grant record 308 can include data specifying the time 310 of permitted UL transmission.

At 312, the control unit can receive, via the communications interface 224, two DL grant records 314(1), 314(2) (individually or collectively referred to herein with reference 314). The notation "(n)" used in FIG. 3 and throughout is used for brevity to denote multiple items represented using one graphical element. Some examples receive N DL grant records 314(1)-314(N), N∈ℤ >1. For example, the control unit can perform a blind search on a PDCCH to locate record(s) intended for the terminal 116, 202 and using DCI Format 1 or other formats indicating the presence of downlink data (e.g., 3GPP 36.212 § 5.3.3.1.2 et al.; 3GPP 36.213 § 7.1.6). The two DL grant records can be associated with the second access network (e.g., LTE), and the second access network can be different from the first access network, in some examples.

In some examples, the control unit reads the PDCCH to receive data indicating, for UL grant records 308, DL grant records 314, or other grants described herein: the starting and ending PRB (or one of those, together with a count of PRBs); the modulation to be used; the number of layers to be used; or other grant parameters. For example, a DL grant record 314 can indicate PRBs within the PDSCH on which the terminal will receive data. Therefore, the DL grant record(s) 314 determine or indicate the DL frequencies 316 in use. The terminal can also locate or otherwise determine UL grants for the HARQ of the DL grant, to be sent on the PUSCH. In some examples, each DL grant record 314 is associated with a HARQ UL grant. Note that any particular terminal 116 may only be aware of DL frequencies in use for that terminal's data. Operation 324, and other operations described herein for transmitting UL data in a way that reduces negative effects of IMD and other conflicts, can be used by a particular terminal 116 with respect to the set of DL frequencies 316 known by that terminal 116 to be in use, in some examples.

Operations 306 and 312 are mutually independent: neither requires as input an output of the other. Therefore, operations 306 and 312 (and, likewise, other groups of operations described herein as "mutually independent") can be performed in either order, in parallel, at least partly overlapping in time, or partly or wholly as a combined operation, in various examples. For example, operation 312 can be performed at least partly before or concurrently with operation 306, or vice versa, in some examples.

Each DL grant record 314 indicates a respective DL frequency 316(1), 316(2) (or, e.g., 316(1)-316(N)) of DL transmission. In some examples, the DL frequencies 316 can be specified directly in the DL grant records 314, as shown. Additionally or alternatively, the DL frequencies 316 can be specified by (e.g., associated with) scrambling sequences or other framing data included in the DL grant records 314, or used in preparing or transmitting the DL grant records 314.

Each DL grant record 314 is associated with a respective time 318(1), 318(2) ( . . . 318(N)) of a respective DL transmission. For example, the time can be the subframe in which the DL grant record 314 is received (e.g., 3GPP 36.213 § 7.1). Additionally or alternatively, a DL grant record 314 can include data specifying the respective time 318 of the respective DL transmission.

DL frequencies 316 (and, likewise, other UL or DL frequencies described herein) can be specified as discrete values or as ranges. Values, or endpoints of ranges, can be defined in or as hertz, channel numbers in a predetermined channel map or band plan, subcarrier numbers in a cellular band (e.g., LTE or NR), carrier or subcarrier numbers or center frequencies, or combinations of any of those. For example, a DCI format 1, allocation type 0 DL grant record 314 includes a bitmap indicating which PRBs are allocated for DL data transmission (3GPP 36.213 § 7.1.6.1; 3GPP TS 36.211 v14.6.0 § 6.2.3.1). Each PRB includes a group of subcarriers, and that group is contiguous in the frequency domain. Accordingly, the PRB assignment indicates what portion, in the frequency domain, of the band allocated to the cellular network transmitting the DL grant record 314 is to be used for the DL transmission. The absolute frequency of the DL transmission in a particular DL band or sub-band can be determined based on information previously received by, or provisioned into, the terminal 116, 202 about that band or sub-band, e.g., information in a SystemInformationBlock (SIB) information element (IE) such as SIB1 or SIB2.

At 320, the control unit can determine that the respective times 318 of DL transmission at least partly overlap with the time 310 of UL transmission. For example, the control unit can determine that the time 310 has in common with at least one of the DL times 318 at least one time period at a predetermined time resolution, e.g., at least one symbol in common, or at least one slot, subframe, TTI, frame, or number (whole or fractional) of seconds.

At 322, the control unit can determine, based on the conflict data 212, that the respective frequencies 316 of DL transmission are associated with an inter-band conflict. In some examples, operations 320 and 322 are mutually independent, so can be performed in either order with respect to each other, or at least partly concurrently, or in a single, combined operation. Examples of operation 322 and conflict data 212 are discussed in the following paragraphs.

Inter-band conflicts can include, e.g., conflicts between DL and UL bands (or sub-bands, and likewise throughout this paragraph), between different access networks (e.g., LTE vs. NR), or other conflicts. In some examples, a 20 MHz contiguous frequency allocation for DL is divided into two DL portions, e.g., LTE and NR. A separate 20 MHz contiguous frequency allocation for UL is divided into two UL portions, e.g., LTE and NR. Inter-band conflicts can include, e.g., conflicts in which the frequencies in use in one of the DL portions produce harmonics or IMD products that fall within one of the UL portions. Table 2 gives examples of configurations in which inter-band conflicts may occur.

At 324, the control unit can transmit the first data 304 at a time 326 later than the time 310 of permitted UL transmission. For example, the control unit can transmit the first data 304 during a time permitted by a different UL grant record than UL grant record 308. Operation 324 can be performed, e.g., in response to determining at operation 322 that the respective frequencies 316 of DL transmission are associated with an inter-band conflict. In some examples of operation 324, the control unit causes the terminal 116 to not transmit the first data 304 at the time 310 of permitted UL transmission. This can reduce the probability that the first data 304 will be corrupted by IMD or other artifacts of inter-band conflicts.

In some examples of operation 322, the control unit can determine that the respective frequencies 316 of DL transmission are associated with an inter-band conflict if those DL frequencies 316 are in respective, associated ranges. For example, conflict data 212 can include a plurality of first frequency ranges and a plurality of second frequency ranges. Each of the first frequency ranges can be associated with a respective one of the second frequency ranges. Operation 322 can include determining that a first DL frequency 316 of the respective frequencies 316 of DL transmission is located in one of the first frequency ranges and that a second DL frequency 316 of the respective frequencies 316 of DL transmission is located in the respective one of the second frequency ranges. Throughout this document, any "frequency range" can include one set of endpoints or multiple sets of endpoints, unless expressly indicated.

Example frequency ranges are given in Table 2. Table 2 provides examples of configurations in which a 20 MHz contiguous frequency allocation is divided into an LTE band and an NR band. Frequency ranges given in Table 2 can be applied to a UL sub-band, a DL sub-band, either, or both. In Table 2, the first and second frequency ranges of any configuration can be exchanged to form another configuration considered as recited in this document. Configurations given in Table 2, including those marked with notes <A>, <B>, and <C>, can be used, e.g., in the DC_(n)71B configurations of 3GPP Technical Report (TR) 37.863-01-01 v15.0.0 (2018-06) Table 6.69.5-1 (see Table 1, above). Some examples include conflict data 212 listing or representing at least one row, or any combination, or all, of the rows in Table 2, or of any variants of those rows described in this paragraph or elsewhere herein. In Table 2, the resource block numbering is contiguous from LTE into NR. E.g., the first row assigns RBs 0-24 to LTE and RBs 25-49 to NR.

TABLE 2

| Configuration | First frequency range start (RB) | First frequency range end (RB) | Second frequency range start (RB) | Second frequency range end (RB) |
|---|---|---|---|---|
| 5 MHz LTE<br>15 MHz NR | 10 | 14 | 32 | 46 |
| 5 MHz LTE<br>15 MHz NR | 0 | 4 | 64 | 78 |
| 5 MHz LTE <A><br>15 MHz NR | 20 | 24 | 25 | 39 |
| 15 MHz LTE<br>5 MHz NR | 30 | 44 | 10 | 14 |
| 15 MHz LTE<br>5 MHz NR | 0 | 14 | 20 | 24 |
| 15 MHz LTE <B><br>5 MHz NR | 60 | 74 | 75 | 79 |
| 10 MHz LTE<br>10 MHz NR | 19 | 28 | 20 | 29 |
| 10 MHz LTE<br>10 MHz NR | 0 | 9 | 42 | 51 |
| 10 MHz LTE <C><br>10 MHz NR | 40 | 49 | 50 | 59 |
| 10 MHz LTE <C><br>10 MHz NR | 0 | 9 | 90 | 99 |
| | (e.g., LTE) | | (e.g., NR) | |

Note
<A>: In a nonlimiting example, center frequencies LTE 665.5 MHz UL, 619.5 MHz DL; NR 675.5 MHz UL, 629.5 MHz DL.
Note
<B>: In a nonlimiting example, center frequencies LTE 670.5 MHz UL, 624.5 MHz DL; NR 680.5 MHz UL, 634.5 MHz DL
Note
<C>: In a nonlimiting example, center frequencies LTE 660 MHz UL, 622 MHz DL; NR 678 MHz UL, 632 MHz DL For example, operation 322 can include determining the inter-band conflict, e.g., indicative of IMD or high MSD, based on the allocation of the PRBs for both LTE and NR. The conflict data 212 can include data (e.g., from Table 2) indicating which allocation(s) of PRBs produce, or are likely to produce, which IMD product(s) (or other frequency combinations), or problematic IMD product(s) (or other frequency combinations). The control unit can examine the DL frequencies 316 allocated during each slot, subframe, TTI, frame, or other time period. If the DL frequencies 316 allocated (e.g., used or to be used for transmission of DL data) in a particular time period are indicated in conflict data 212 (e.g., indicated at all, or specifically indicated as producing, e.g., IMD3 or IMD5), then the control unit can skip or defer NR UL transmission of the first data 304 during that time period (e.g., transmit that data later; operation 324). In some examples, the DL frequency 316 allocations can be considered for each access network (e.g., RAN, such as LTE or NR) individually, so that UL transmission is skipped or deferred only if the DL frequencies 316 producing the conflict (e.g., matching criteria in Table 2) are from the same RAN as the intended UL transmission. In other examples, the allocations of DL frequencies 316 can be considered across RANs, so that UL TX is skipped or deferred if the allocations for multiple access networks (e.g., LTE and NR), considered together, produce a conflict.

For example, the last row of Table 2 lists frequency range 1 having RBs 0-9 and frequency range 2 having RBs 42-51. When terminal 116,202 receives DL grant(s) for NR that include, for a particular time period, at least one PRB between 0 and 9 and at least one PRB between 42 and 51, the control unit can determine (at operation 322), based on the match between those PRBs and that row in conflict data 212, that IMD is likely to affect uplink during that time period. Therefore, the control unit can avoid sending uplink traffic during that time period on the NR link. For example, the control unit can refrain from sending a scheduling request (SR) associated with that time period; can refrain from sending an SR until at or after that time period; or can disregard a UL grant for that time period. This IMD is a nonlimiting example of an inter-band conflict.

In some examples of IMD, IMD products arising from two concurrent UL transmissions in one or more access networks fall into a DL band of one of those access networks. However, some prior schemes do not consider the effect on UL of concurrent DL transmission. Unlike these schemes in some examples, single UL transmission is sometimes used, as described herein (e.g., operation 324, or operations 324 and 428), to mitigate IMD (e.g., 3rd or 5th order) and improve transmission of VoLTE traffic (e.g., clearer voice; fewer call drops).

Some specific, non-limiting examples of IMD are now provided for clarity of explanation. In an example of B71/n71, concurrent DL traffic at 620 MHz and 642 MHz can generate IMD3 products including 664 MHz and 686 MHz. These fall within the B71/n71 UL range of 663 MHz-698 MHz. Therefore, DL allocations indicating these DL frequencies will be used can be indicative of an inter-band conflict.

Another example uses a portion B71/n71 divided into two sub-bands, one for LTE and one for NR. In this example, the top 20 MHz of the B71/n71 DL range is used: 632-642 MHz for a first access network, and 642-652 MHz for a second access network. The bottom 20 MHz of the UL range are used: 663-673 MHz for the first access network and 673-683 MHz for the second access network. A DL PRB allocation of PRB 9 in the first access network (633.62 MHz) and PRB 42 in the second access network (649.56 MHz) may produce IMD3 at 663.5 MHz, within the UL range of the first access network, and IMD5 at 681.44 MHz, within the UL range of the second access network. Therefore, this PRB allocation can indicate an inter-band conflict.

In some examples, the control unit can skip or defer uplink transmission (e.g., operation 324) in the presence of any allocation with at least one RB in a first frequency range listed in conflict data 212 and at least one RB in the respective second frequency range listed in conflict data 212. LTE and NR have been discussed for clarity, but these are not limiting; their roles can be exchanged (e.g., DL grants for LTE, and avoiding sending uplink traffic during a conflict time on LTE), or other access networks can be used (such as, without limitation, two access networks of the different types, e.g., avoiding sending NR UL traffic in conflict with LTE DL traffic, or avoiding sending LTE UL traffic in conflict with NR DL traffic).

In some examples, the control unit can perform at least one of operations 320 and 322 during, or with respect to, each subframe, each TTI, each slot in each subframe, each frame, or other time periods. In some examples, the terminal applies UL control (e.g., skips, defers, or refrains from sending data) during the time 310 of permitted UL transmission or another "conflict time period" including the time 310. Examples of conflict time periods can include, e.g., a slot, subframe, TTI, or frame including the time 310. Additionally or alternatively, the terminal can apply UL control in a TTI, subframe, or slot that is a multiple of 125 µs, 250 µs, 500 µs, or 1 ms (or, e.g., 25%, 50%, or 200% of a predetermined time period) after a conflict time period (e.g., 1.5 ms after the conflict time period).

Figure 4:
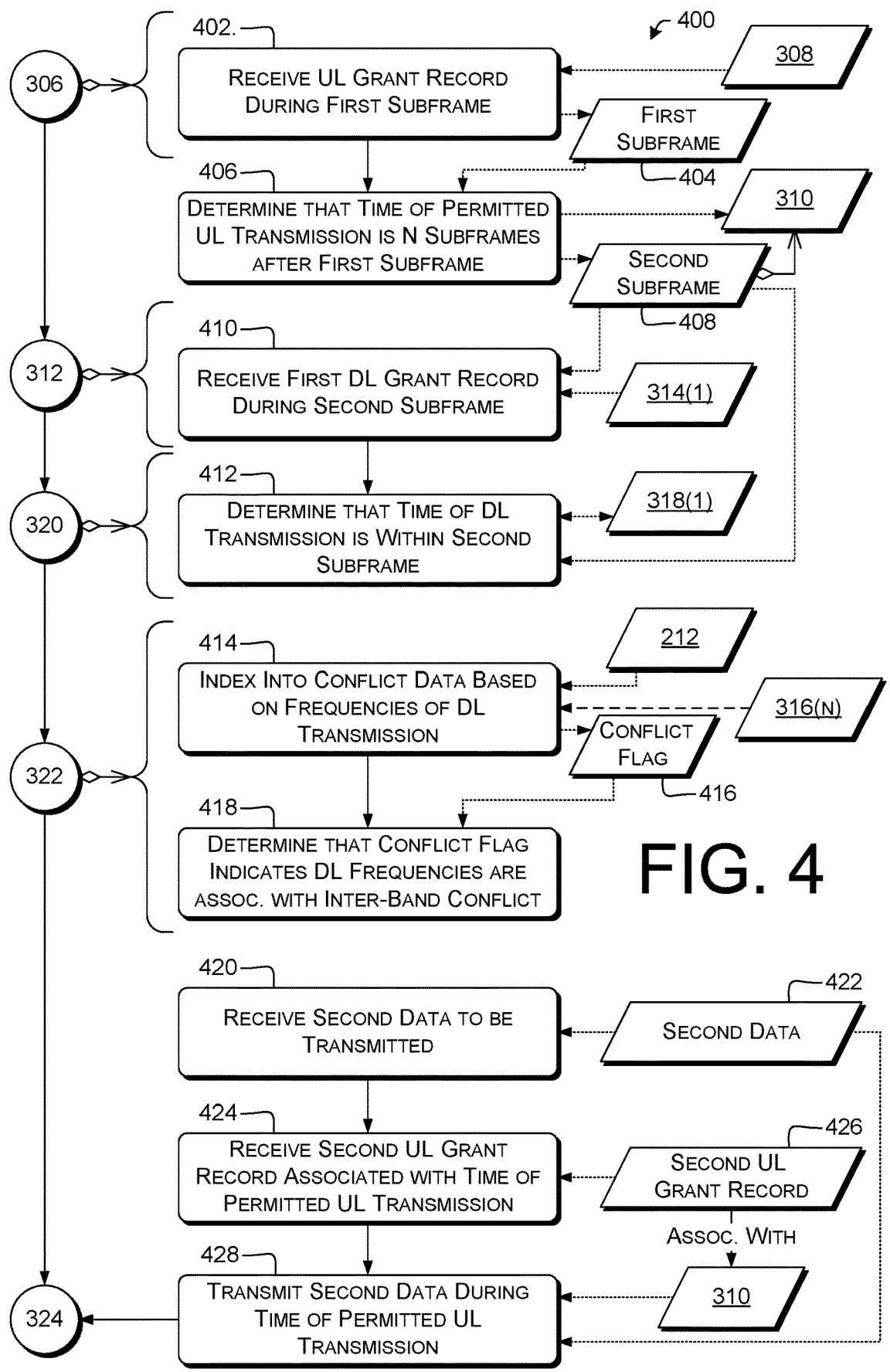
FIG. 4 illustrates example processes for transmitting, and controlling transmission of, uplink data.

FIG. 4 is a dataflow diagram illustrating example processes 400 for bearer management and related data items. For clarity, dataflow is shown using stippled or dashed lines. Process 400 can be performed, e.g., by a control unit of terminal 116, 202, e.g., in response to computer program instructions of the traffic-control component 210. In some examples, operation 306 can include operation 402; operation 312 can include operation 410; operation 320 can include operation 412 (or operations 406 and 412); operation 322 can include operations 414 and 418; or operation 428 can be followed by operation 324.

At 402, the control unit can receive the UL grant record 308 during a first subframe 404. For example, the control unit can perform blind search on a PDCCH or otherwise locate the UL grant record 308, e.g., as discussed herein with reference to operation 306.

At 406, the control unit can determine that the time 310 of permitted UL transmission is within a second subframe 408 that is a predetermined number N of subframes after the first subframe 404, $N \in \mathbb{Z} > 1$. For example, N can be a parameter of the particular access network (e.g., N=4 for LTE).

At 410, the control unit can receive at least a first DL grant record 314(1) of the two DL grant records 314 during the second subframe 408.

At 412, the control unit can determine that the time 318(1) of DL transmission associated with the first DL grant record 314(1) is within the second subframe 408. For example, in LTE, DL grant records 314 are sent at the beginning of the subframe to which they apply. The control unit can therefore determine, for an LTE DL grant record 314(1) received within the second subframe 408, that the time 318(1) is within that second subframe 408. In other examples, the control unit can retrieve transmission times from the DL grant record 314(1) and compare those times to a temporal extent of second subframe 408. The determination at operation 412 can be an example of operation 320.

Various examples use conflict data 212 in determining that the respective frequencies of DL transmission are associated with an inter-band conflict (operation 322).

At 414, the control unit can index into the conflict data 212 based on the respective frequencies 316 of DL transmission to retrieve a conflict flag 416. Conflict flag 416 can include, e.g., a Boolean value indicating whether a conflict is present or not for the given respective DL frequencies 316. Additionally or alternatively, conflict flag 416 can indicate whether or not the given respective DL frequencies 316 are recorded in association with each other in conflict data 212 (which may, for example, record only frequency pairs or sets that are associated with conflicts). Additionally or alternatively, conflict flag 416 can include an expected level of MSD (in any desired units, absolute or relative) or an expected power (in any desired units, absolute or relative) of a predetermined IMD term (e.g., IMD3 or IMD5).

At 418, the control unit can determine that the conflict flag 416 indicates that the respective frequencies of DL transmission are associated with an inter-band conflict. For example, for a Boolean conflict flag 416, operation 418 can include comparing the conflict flag 416 to a predetermined value (e.g., True=conflict). For conflict flags 416 indicating MSD levels or IMD power, operation 418 can include comparing the conflict flag 416 to a predetermined threshold.

Some examples prioritize one type of data, e.g., GBR, over another type of data, e.g., non-GBR. Some of these examples use operations 420-428.

At 420, the control unit can receive second data 422 to be transmitted. Examples are discussed herein, e.g., with reference to operation 302.

At 424, the control unit can receive a second UL grant record 426 associated with the time 310 of permitted UL transmission and with the second access network. Examples are discussed herein, e.g., with reference to operation 306. For example, the second UL grant record 426 can be associated with the same subframe, slot, symbol, or other time period as the UL grant record 308. In some examples, the time 310 of permitted UL transmission can be within second subframe 408, or at another time that at least partly overlaps with the time(s) 318 of DL transmission.

At 428, the control unit can transmit the second data 422 during the time 310 of permitted UL transmission. Examples are discussed herein, e.g., with reference to operation 324. Operation 428 can be performed notwithstanding the possibility of IMD or other effects due to the inter-band conflict. For example, VoLTE (or VoNR) UL second data 422 can be sent at operation 428. This can increase the likelihood that VoLTE UL traffic will be successfully received, which can improve voice quality of an ongoing VoLTE session. Sending UL second data 422, but not sending UL first data 304 concurrently, can also increase the amount of power available at terminal 116 for the UL transmission of second data 422, in some examples, which can mitigate the negative effects of conflicts on the transmission of second data 422.

In some examples using operations 420, 424, and 428, the first access network can be NR and the second access network can be LTE. The second data 422 can be VoLTE data, or other GBR data. Using operation 428, even in the face of possible inter-band conflicts, can permit maintaining GBR data transmission rates, which can reduce call drops or glitches. Operation 428 can additionally or alternatively be used as described in this paragraph or the preceding paragraph with respect to GBR traffic other than VoLTE, with the roles of LTE and NR interchanged, or with respect to other type(s) of access networks.

Figure 5:
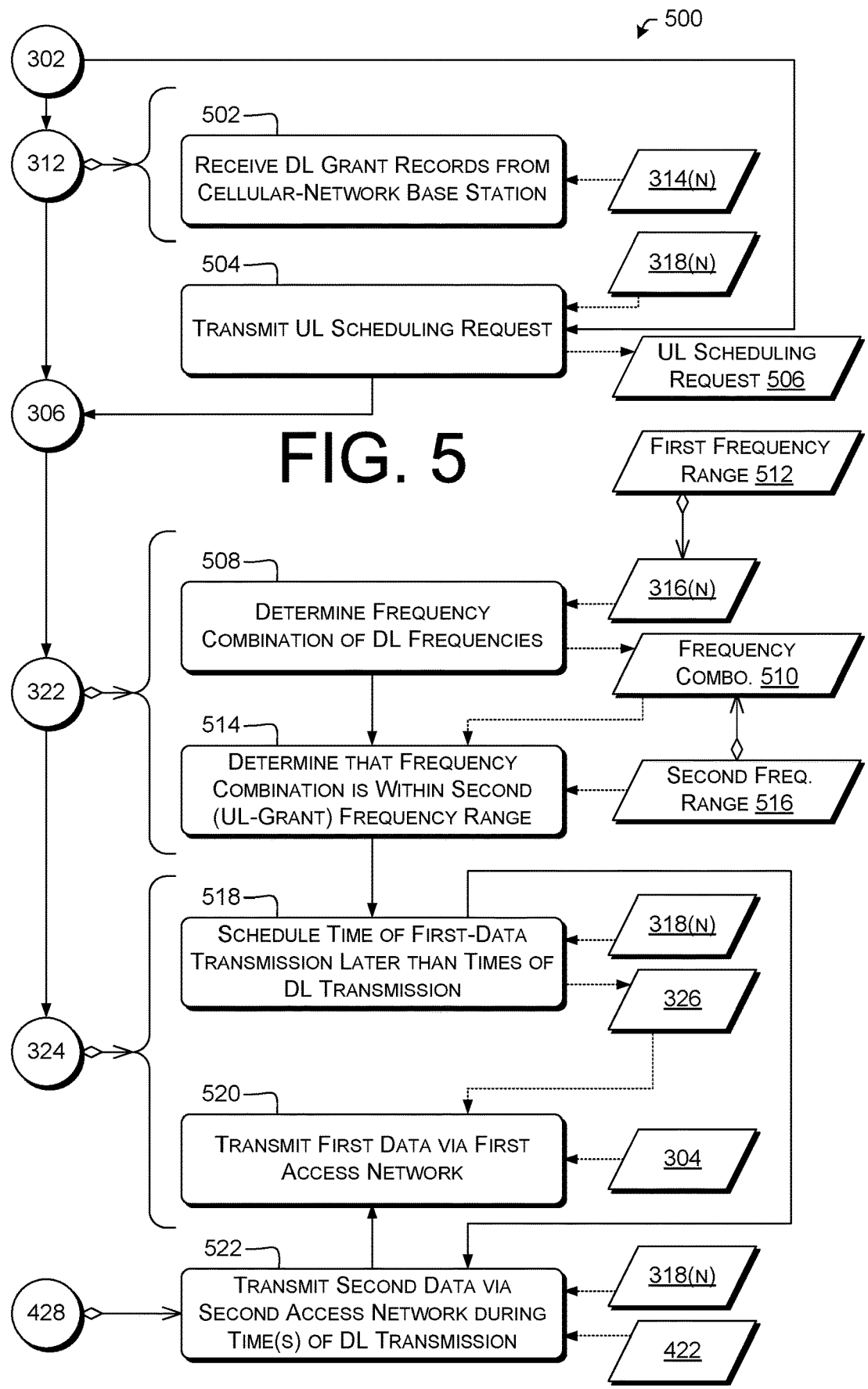
FIG. 5 illustrates example processes for transmitting, and controlling transmission of, uplink data, e.g., via multiple access networks.

FIG. 5 is a dataflow diagram illustrating an example process 500 for bearer management and related data items. For clarity, dataflow is shown using stippled or dashed lines. Process 500 can be performed, e.g., by a control unit of terminal 116, 202, e.g., in response to computer program instructions of the traffic-control component 210. In some examples, operation 302 can be followed by operation 312 or operation 504; operation 312 can include operation 502; operation 504 can be followed by operation 306; operation 322 can include operations 508 and 514; operation 514 can be followed by operation 518; operation 324 can include operations 518; operation 324 can include operation 520; or operation 428 can include operation 522. In some examples, the first data 304 is associated with a non-guaranteed-bit-rate (non-GBR) data stream. In some examples, the second data 422 is associated with a guaranteed bit-rate (GBR) data flow.

At 502, the control unit can receive the DL grant records 314 from a cellular-network base station, e.g., an LTE BS 108 or NR BS 112. Examples are discussed herein, e.g., with reference to FIG. 1 and operation 312. As noted above, operations 306 and 312 are mutually independent, so can be performed in either relative order. In the illustrated example, operation 312 precedes operation 306.

At 504, the control unit can transmit a UL scheduling request 506 via the communications interface 224 to the cellular-network base station. In some examples, the control unit can transmit the UL SR 506 at a time different from both of the respective times 318 of DL transmission. Operation 504 can be performed after receiving the first data 304. In some examples, operation 504 can be performed before operation 306. Operations 502 and 504 are mutually independent. In some examples, operation 504 can include sending the UL SR 506 via an LTE or NR physical uplink control channel (PUCCH) or random-access channel (RACH) (e.g., 3GPP TS 36.321 v14.5.0 § 5.4.4, § 5.1).

In some examples, the control unit can send the UL SR 506 at a time that is the same as, or that at least partly overlaps, the times 318 of DL transmission. Operation 504 can be performed notwithstanding the possibility of IMD or other effects due to the inter-band conflict, in some of these examples. Examples of transmitting notwithstanding such possibilities are described herein with reference to operation 428. Some of these examples prioritize SRs 506 for VoLTE traffic over SRs for NR traffic in the event of an inter-band conflict. This can increase the probability of successfully transferring VoLTE traffic. Operation 504 can additionally or alternatively be used as described in this paragraph with respect to GBR traffic other than VoLTE, with the roles of LTE and NR interchanged, or with respect to other type(s) of access networks.

At 508, the control unit can determine a frequency combination 510 of the respective frequencies 316 of DL transmission. For example, the control unit can determine harmonics, beat frequencies, or IMD products (e.g., IMD3 or IMD5) based on the DL frequencies 316. In some examples, the set of (or individual members of the set of) IMDn products $f_{IMD,n}$ of frequencies $f_1$ and $f_2$ is computed as in Eq. (1). Examples are described herein. In some examples, the frequencies 316 of DL transmission are within a first frequency range 512. Since modulated signals have bandwidth>0 (i.e., energy at more frequencies than merely the carrier), IMD products or other frequency combinations 510 involving at least one modulated signal will also have bandwidth>0. Eq. (1) can be used, e.g., with respect to each end of each participating signal to determine the extent of a particular frequency combination 510. Accordingly, the term "frequency combination" herein can refer to a single frequency, e.g., computed using Eq. (1), or to a range of frequencies.

$$f_{IMD,n} = \{k_1 f_1 + k_2 f_2 \mid |k_1| + |k_2| = n, k_i \in \mathbb{Z}, n \in \mathbb{Z}\} \quad (1)$$

At 514, the control unit can determine that the respective frequencies 316 of DL transmission are associated with the inter-band conflict at least partly by making a determination that the frequency combination 510 is at least partly within a second frequency range 516 associated with the UL grant record 308 and different from the first frequency range 512. Some examples retrieve data of frequency ranges 512, 516 from conflict data 212; other examples do not access conflict data 212. In some examples, the second frequency range 516 can be an entire band or sub-band allocated for UL on the access network that provided the UL grant record 308. Additionally or alternatively, the second frequency range 516 can be or include subcarriers or other frequencies or frequency ranges associated with (e.g., indicated in) the UL grant record 308.

At 518, the control unit can schedule the time 326 of transmission of the first data 304 to be later than both of the respective times 318 of DL transmission. For example, the control unit can disregard the UL grant record 308 and select a different UL grant to be used for transmitting the first data 304, e.g., as discussed herein with reference to operation 424.

At 520, the control unit can transmit the first data 304 via a first access network. Operation 520 can be carried out at or during the scheduled time 326. Examples are discussed herein, e.g., with reference to FIG. 1 or operation 324.

At 522, the control unit can transmit the second data 422 via a second, different access network at least partly during at least one of the respective times 318 of DL transmission. Examples are discussed herein, e.g., with reference to FIG. 1 or operations 324 or 428. In some examples, operation 522 is performed before operation 520. In some examples, operation 522 is performed after, e.g., follows, operation 518.

Figure 6:
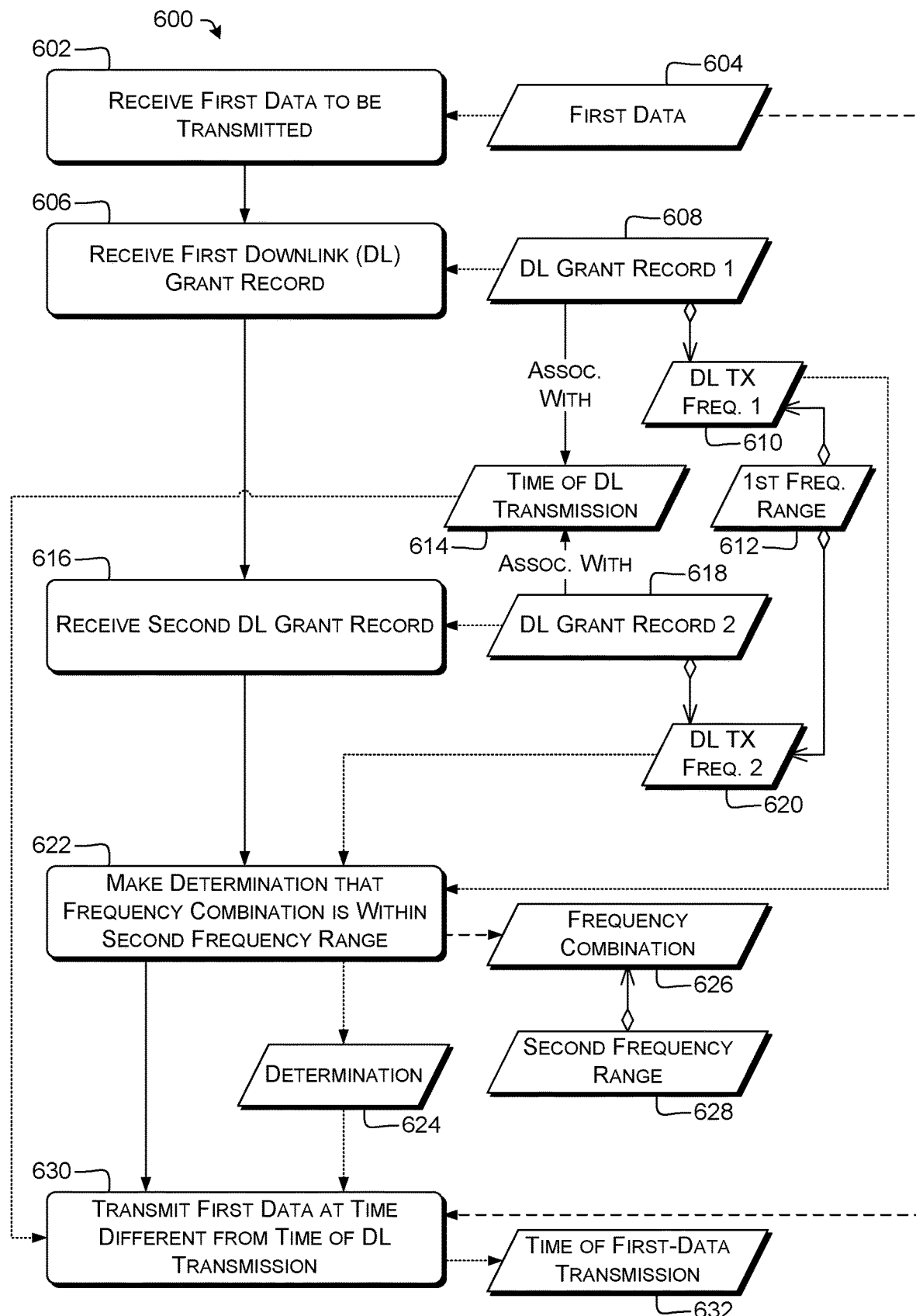
FIG. 6 illustrates an example process for transmitting, and controlling transmission of, uplink data.

FIG. 6 is a dataflow diagram illustrating an example process 600 for bearer management and related data items. For clarity, dataflow is shown using stippled or dashed lines. Process 600 can be performed, e.g., by a control unit of terminal 116, 202, e.g., in response to computer program instructions of the traffic-control component 210. In some examples, at least one tangible, non-transitory computer-readable medium can store instructions executable by at least one processor to cause the at least one processor to perform operations of process 600. In some examples, the instructions can also cause the at least one processor to perform operations of any of processes 700 or 800.

At 602, the control unit can receive first data 604 to be transmitted. Examples are discussed herein, e.g., with reference to operation 302.

At 606, the control unit can receive (e.g., via a first access network or a second access network) a first downlink (DL) grant record 608 (e.g., DCI 1 or other DCIs listed above) indicating a first frequency 610 of DL transmission in a first frequency range 612 (e.g., a band or sub-band, expressed in, e.g., Hz, PRBs, subcarriers or other forms) and associated with a time 614 of DL transmission. Examples are discussed herein, e.g., with reference to operation 312, DL grant records 314, frequencies 316 of DL transmission, and times 318 of DL transmission. The time 614 can be in the subframe in which the DL grant record 608 is received, or at a future time specified in the DL grant record 608. In some examples, the control unit can receive the first DL grant record 608 from a cellular-network base station, e.g., LTE BS 108 or NR BS 112.

At 616, the control unit can receive, from the cellular-network base station, a second DL grant record 618 indicating a second frequency 620 of DL transmission in the first frequency range 612 and associated with the time 614 of DL transmission. In some examples, the time 614 of DL transmission is a time or time period associated with both first DL grant record 608 and second DL grant record 618, even if either DL grant record 608, 618 extends temporally before or after the other. Examples are discussed herein, e.g., with reference to operations 312 or 606. In some examples, the second frequency 620 of DL transmission can be different from the first frequency 610 of DL transmission. Examples are discussed herein, e.g., with reference to operation 606. Operations 606 and 616 are mutually independent.

At 622, the control unit can make a determination 624 (e.g., programmatically determine data indicating the determination 624) that a frequency combination 626 of the first frequency 610 of DL transmission and the second frequency 620 of DL transmission is at least partly within a second frequency range 628 different from the first frequency range 612. For example, the first frequency range 612 and the second frequency range 628 can be disjoint from each other; adjacent to each other; or at least partially overlapping and at least partially non-overlapping. Examples are discussed herein, e.g., with reference to operations 508 and 514. In some examples, at least one of the first frequency range 612 or the second frequency range 628 can be a portion of a split band. For example, a 20 MHz band can be divided into 5 MHz LTE, 10 MHz NR, and 5 MHz LTE, in that order. Techniques described herein can be used with reference to either LTE block individually, or to the LTE blocks taken as an aggregate.

In some examples, the frequency combination 626, which can represent frequency combination 510, is a harmonic or IMD product. Operation 622 can include computing a frequency value of one or more specific frequency combinations 626, although this is not required. For example, operation 622 can use conflict data 212 instead of or in addition to computing frequencies (e.g., using Eq. (1)). Examples are discussed herein, e.g., with reference to operations 414 and 418. In making the determination 624, the control unit can determine whether or not the frequency combination 626 exists as a physical signal, e.g., over the air or in the receiver (e.g., as intermodulation introduced in the RX electronics). However, this is not required, and other examples can include making the determination 624 without regard for whether any RF energy is actually present at the frequenc(ies) of frequency combination 626.

At 630, the control unit can transmit the first data 604 at a time 632 different from the time 614 of DL transmission. Examples are discussed herein, e.g., with reference to operation 324. The time 632 of UL transmission can be earlier or later than the time 614 of DL transmission. In some examples of operation 630, the control unit causes the terminal 116 to not transmit the first data 604 at the time 614 of DL transmission. Operation 630 can be performed in response to the determination at operation 622. Examples are discussed herein, e.g., with reference to operations 324, 406, or 518. In some examples, operation 630 can include transmitting the first data 604 via a cellular network.

Figure 7:
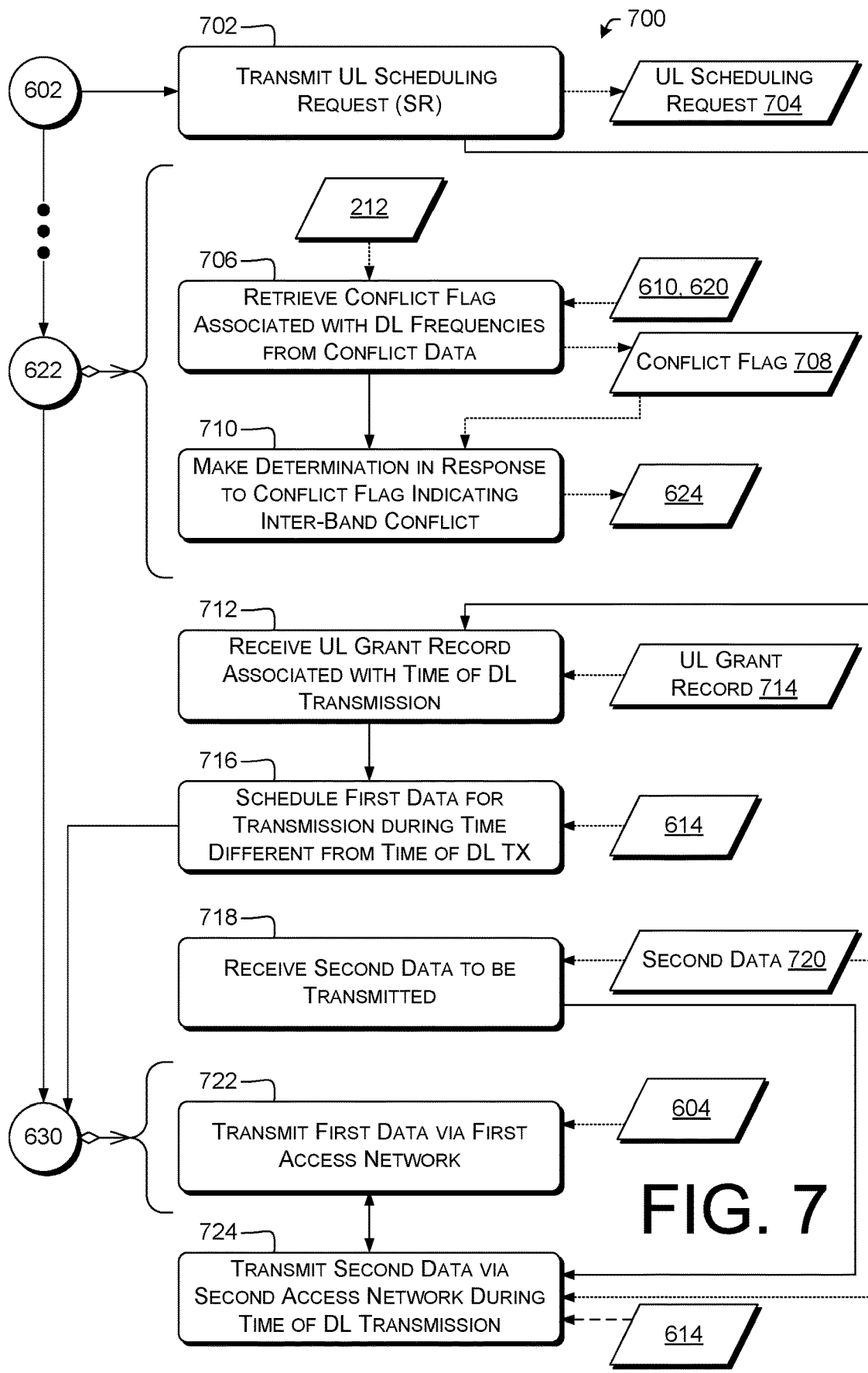
FIG. 7 illustrates example processes for transmitting, and controlling transmission of, uplink data, e.g., via multiple access networks.

FIG. 7 is a dataflow diagram illustrating an example process 700 for bearer management and related data items. For clarity, dataflow is shown using stippled or dashed lines. Process 700 can be performed, e.g., by a control unit of terminal 116, 202, e.g., in response to computer program instructions of the traffic-control component 210. In some examples, operation 602 can be followed by operation 702; operation 622 can include operations 706 and 710; operation 716 can be followed by operation 630; or operation 630 can include operation 722.

At 702, the control unit can transmit a UL scheduling request 704. For example, operation 702 can be used with LTE or NR non-persistent scheduling. Operation 702 can be performed after (e.g., in response to) receiving the first data 604 at operation 602. Operation 702 can include transmitting the UL SR 704 to a cellular-network base station, e.g., a BS from which the DL grant records 608, 618 were received.

In some examples, the UL scheduling request 704 is not sent during a time when IMD or other conflicts are likely to interfere with reception of the scheduling request, or is sent during a time when such conflicts (e.g., inter-band conflicts) are unlikely. For example, in response to the determination 624, the control unit can transmit the UL scheduling request 704 at a time that is: earlier than the time 632 of transmitting the first data 604; and different from the time 614 of DL transmission.

Some examples of operation 622 include making the determination 624 based at least in part on conflict data 212. This can, e.g., permit making the determination 624 without computing frequency combinations 510. Some of these examples include operations 706 and 710.

At 706, the control unit can retrieve, from predetermined conflict data 212, a conflict flag 708 associated with both the first frequency 610 of DL transmission and the second frequency 620 of DL transmission. Examples are discussed herein, e.g., with reference to operation 414.

At 710, the control unit can make the determination 624 in response to the conflict flag 708 indicating that the first frequency 610 of DL transmission and the second frequency 620 of DL transmission are associated with an inter-band conflict. Examples are discussed herein, e.g., with reference to operation 418.

Some examples bypass or disregard existing UL grants. Some of these examples include operations 712 and 716. In some examples, operation 712 is performed after operation 702.

At 712, the control unit can receive, from the cellular-network base station, an uplink (UL) grant record 714 (e.g., DCI 0) associated with the second frequency range 628 and with the time 614 of DL transmission. In some examples, the transmission time of UL grant record 714 plus N subframes, or a time specifically indicated in the grant, overlaps at least partly with the time 614. Examples are discussed herein, e.g., with reference to operations 306 or 402.

At 716, the control unit can schedule the first data 604 for transmission during the time 632 different from the time 614 of DL transmission, even though the UL grant record 714 permits transmission during the time 614 of DL transmission. For example, the control unit can disregard or bypass the UL grant indicated in the UL grant record 714. In some examples of operation 716, the control unit causes the terminal 116 to not transmit the first data 604 at the time 614 of DL transmission, even though that is a permitted time of UL transmission. Operation 716 can be performed in response to the UL grant record 714 and to the determination 624, in some examples. Operation 716 can be followed by (or otherwise precede) operation 630.

Some examples relate to terminals 116 supporting dual connectivity with multiple, different access networks. Some of these examples use operations 718-724 to maintain transmission of GBR UL data (e.g., VoLTE) while time-shifting non-GBR UL data to avoid conflicts. In some of these examples, the first data is associated with a non-guaranteed-bit-rate (non-GBR) data flow.

At 718, the control unit can receive second data 720 to be transmitted. The second data 720 can be associated with a guaranteed bit-rate (GBR) data flow, e.g., VoLTE or VoNR. Examples are discussed herein, e.g., with reference to operation 420.

At 722, the control unit can transmit the first data 604 via a first access network. As noted above with reference to operation 630, operation 722 can be performed at the time 614 that is different from the time 614 of DL transmission. In some examples, operation 722 can include transmitting the first data 604 associated with a non-guaranteed-bit-rate (non-GBR) data flow. Examples are discussed herein, e.g., with reference to operations 324 or 520.

At 724, the control unit can transmit the second data 720 (e.g., GBR data) via a second access network at least partly during the time 614 of DL transmission. Examples are discussed herein, e.g., with reference to operations 428 or 522. Operations 722 and 724 are mutually independent. In some examples, operation 724 is performed before operation 722.

Figure 8:
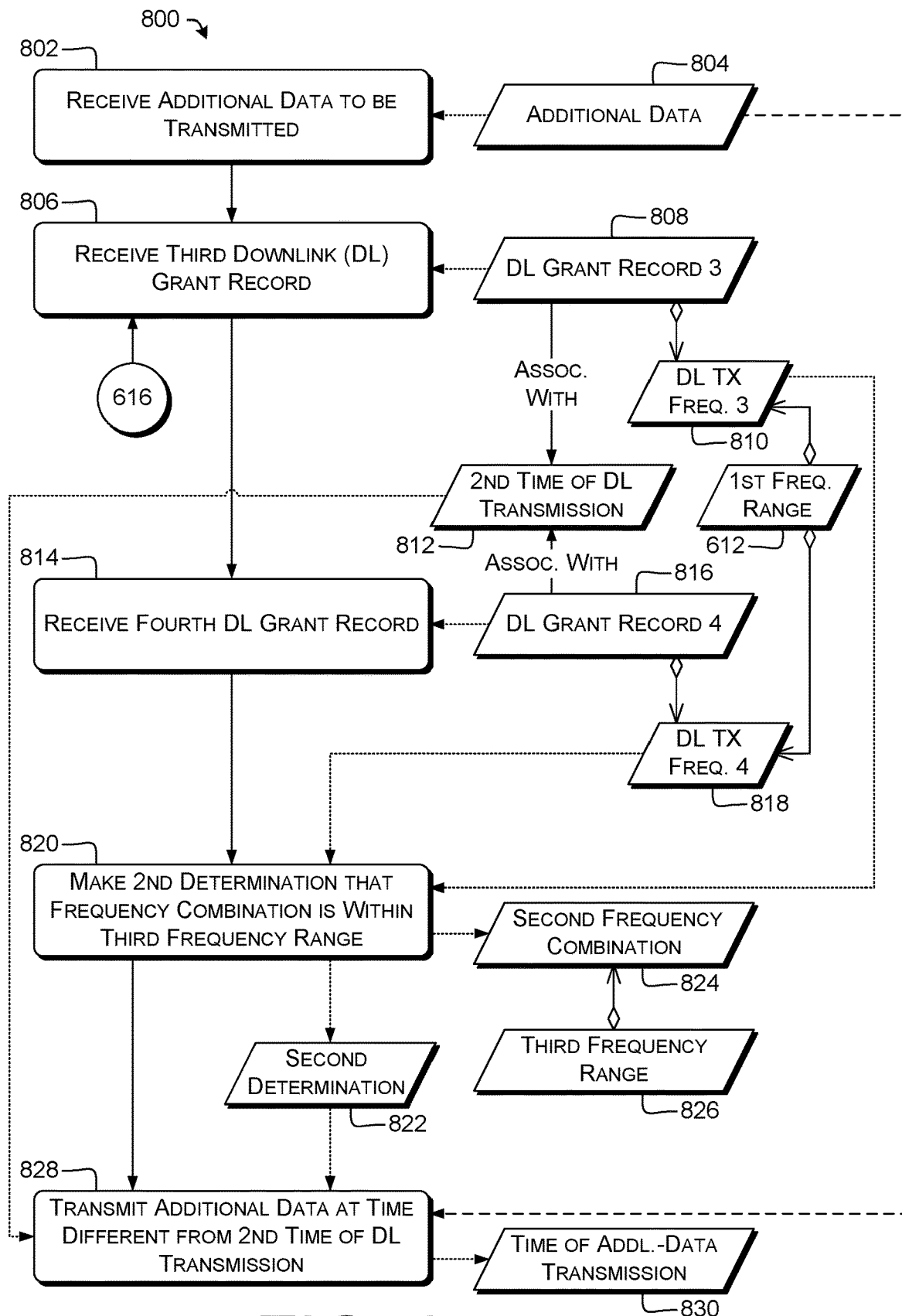
FIG. 8 illustrates example processes for transmitting, and controlling transmission of, uplink data, e.g., with reference to multiple sets of downlink grant records.

FIG. 8 is a dataflow diagram illustrating an example process 800 for bearer management and related data items. For clarity, dataflow is shown using stippled or dashed lines. Process 800 can be performed, e.g., by a control unit of terminal 116, 202, e.g., in response to computer program instructions of the traffic-control component 210. In some examples, multiple pairs of DL grants to a terminal 116 can result in multiple conflict times at which IMD or other effects may negatively affect UL transmission. Accordingly, in some examples, operation 806 is performed at a time after operation 616.

At 802, the control unit can receive additional data 804 to be transmitted. Examples are discussed herein, e.g., with reference to operation 602.

At 806, the control unit can receive, from a cellular-network base station, a third DL grant record 808 indicating a third frequency 810 of DL transmission in the first frequency range 612 and associated with a second time 812 of DL transmission. Examples are discussed herein, e.g., with reference to operation 606. The third frequency 810 can be the same as the first DL frequency 610 or the second DL frequency 620, or different from both of those. The second time 812 of DL transmission can be the same as the time 614 of DL transmission, or different. For example, DL grants 808, 816 can trigger IMD or increase MSD at a different time than time 614, or on a different frequency or in a different frequency range.

At 814, the control unit can receive, from the cellular-network base station, a fourth DL grant record 816 indicating a fourth frequency 818 of DL transmission in the first frequency range and associated with the second time 812 of DL transmission. The fourth frequency 818 can be the same as the first DL frequency 610 or the second DL frequency 620, or different from both of those. The fourth frequency 818 of DL transmission can be different from the third frequency 810 of DL transmission. Examples are discussed herein, e.g., with reference to operation 616.

At 820, the control unit can make a second determination 822 that a second frequency combination 824 of the third frequency 810 of DL transmission and the fourth frequency 818 of DL transmission is at least partly within a third frequency range 826 different from the first frequency range 612. Examples are discussed herein, e.g., with reference to operation 622. The third frequency range 826 can be the same as the second frequency range 628, or different.

At 828, the control unit can transmit the additional data 804 at a time 830 different from the second time 812 of DL transmission. Operation 828 can be performed in response to the second determination 822. Examples are discussed herein, e.g., with reference to operation 630.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A telecommunication terminal, comprising: a communications interface configured to communicate with a cellular network; a memory storing conflict data; and a control unit communicatively connected with the communications interface and the memory, and configured to perform operations comprising: receiving first data to be transmitted; receiving, via the communications interface, an uplink (UL) grant record associated with a time of permitted UL transmission; receiving, via the communications interface, two downlink (DL) grant records, each indicating a respective frequency of DL transmission and associated with a respective time of a respective DL transmission; determining that the respective times of DL transmission at least partly overlap with the time of UL transmission; determining, based on the conflict data, that the respective frequencies of DL transmission are associated with an inter-band conflict; and in response, transmitting the first data at a time later than the time of permitted UL transmission.

B: The telecommunication terminal according to paragraph A, wherein: the UL grant record is associated with a first access network; the two DL grant records are associated with a second, different access network; and the communications interface is configured to communicate concurrently via the first access network and via the second access network.

C: The telecommunication terminal according to paragraph B, the operations further comprising: receiving second data to be transmitted; receiving a second UL grant record associated with the time of permitted UL transmission and with the second access network; and transmitting the second data during the time of permitted UL transmission.

D: The telecommunication terminal according to paragraph C, wherein: the first access network comprises a Third-Generation Partnership Project New Radio (fifth-generation) access network; the second access network comprises a Long-Term Evolution (LTE) access network; and the second data comprises Voice-over-LTE (VoLTE) data.

E: The telecommunication terminal according to any of paragraphs A-D, the operations further comprising determining that the respective frequencies of DL transmission are associated with an inter-band conflict at least partly by: indexing into the conflict data based on the respective frequencies of the DL transmission to retrieve a conflict flag; and determining that the conflict flag indicates that the respective frequencies of DL transmission are associated with an inter-band conflict.

F: The telecommunication terminal according to any of paragraphs A-E, wherein: the conflict data comprises a plurality of first frequency ranges and a plurality of second frequency ranges; each of the first frequency ranges is associated with a respective one of the second frequency ranges; and the operations comprise: determining that a first frequency of the respective frequencies of DL transmission is located in one of the first frequency ranges; and determining that a second frequency of the respective frequencies of DL transmission is located in the respective one of the second frequency ranges.

G: The telecommunication terminal according to any of paragraphs A-F, the operations comprising: receiving the UL grant record during a first subframe; determining that the time of permitted UL transmission is within a second subframe that is a predetermined number N of subframes after the first subframe, wherein N is greater than one; receiving at least a first DL grant record of the two DL grant records during the second subframe; and determining that the time of DL transmission associated with the first DL grant record is within the second subframe.

H: The telecommunication terminal according to any of paragraphs A-G, wherein: the frequencies of DL transmission are within a first frequency range; the UL grant is associated with a second frequency range different from the first frequency range; the first data is associated with a non-guaranteed-bit-rate (non-GBR) data stream; and the operations comprise: receiving the DL grant records from a cellular-network base station; after receiving the first data, transmitting a UL scheduling request via the communications interface to the cellular-network base station at a time different from both of the respective times of DL transmission; determining that the respective frequencies of DL transmission are associated with the inter-band conflict at least partly by making a determination that a frequency combination of the respective frequencies of DL transmission is at least partly within the second frequency range; scheduling the time of transmission of the first data to be later than both of the respective times of DL transmission; receiving second data to be transmitted, the second data associated with a guaranteed bit-rate (GBR) data flow; transmitting the first data via a first access network; and transmitting the second data via a second, different access network at least partly during at least one of the respective times of DL transmission.

I: The telecommunication terminal according to any of paragraphs A-H, the operations further comprising not transmitting (e.g., refraining from transmitting) the first data at the time of permitted UL transmission.

J: The telecommunication terminal according to any of paragraphs A-I, wherein: the frequencies of DL transmission are associated with a first band; the UL grant record is associated with a second, different band; and the operations further comprise determining that the respective frequencies of DL transmission are associated with the inter-band conflict at least partly by: determining an intermodulation distortion (IMD) product of the frequencies of DL transmission; and determining that the IMD product is at least partly within the second band.

K: A method comprising, by a telecommunication terminal: receiving first data to be transmitted; receiving, from a cellular-network base station, a first downlink (DL) grant record indicating a first frequency of DL transmission in a first frequency range and associated with a time of DL transmission; receiving, from the cellular-network base station, a second DL grant record indicating a second frequency of DL transmission in the first frequency range and associated with the time of DL transmission, wherein the second frequency of DL transmission is different from the first frequency of DL transmission; making a determination that a frequency combination of the first frequency of DL transmission and the second frequency of DL transmission is at least partly within a second frequency range different from the first frequency range; and in response to the determination, transmitting the first data at a time different from the time of DL transmission.

L: The method according to paragraph K, further comprising, by the telecommunication terminal: receiving, from the cellular-network base station, an uplink (UL) grant record associated with the second frequency range and with the time of DL transmission; and in response to the UL grant record and to the determination, scheduling the first data for transmission during a time different from the time of DL transmission.

M: The method according to paragraph K or L, further comprising, by the telecommunication terminal, after receiving the first data, transmitting a UL scheduling request to the cellular-network base station.

N: The method according to paragraph M, further comprising, by the telecommunication terminal, in response to the determination, transmitting the UL scheduling request at a time that is: earlier than a time of transmitting the first data; and different from the time of DL transmission.

O: The method according to any of paragraphs K-N, wherein: the first data is associated with a non-guaranteed-bit-rate (non-GBR) data flow; and the method further comprises, by the telecommunication terminal: receiving second data to be transmitted, the second data associated with a guaranteed bit-rate (GBR) data flow; transmitting the first data via a first access network; and transmitting the second data via a second access network at least partly during the time of DL transmission.

P: The method according to any of paragraphs K-O, further comprising, by the telecommunication terminal, making the determination at least partly by: retrieving, from predetermined conflict data, a conflict flag associated with both the first frequency of DL transmission and the second frequency of DL transmission; and making the determination in response to the conflict flag indicating that the first frequency of DL transmission and the second frequency of DL transmission are associated with an inter-band conflict.

Q: The method according to any of paragraphs K-P, further comprising, by the telecommunication terminal: receiving additional data to be transmitted; receiving, from a cellular-network base station, a third DL grant record indicating a third frequency of DL transmission in the first frequency range and associated with a second time of DL transmission; receiving, from the cellular-network base station, a fourth DL grant record indicating a fourth frequency of DL transmission in the first frequency range and associated with the second time of DL transmission, wherein the fourth frequency of DL transmission is different from the third frequency of DL transmission; making a second determination that a second frequency combination of the third frequency of DL transmission and the fourth frequency of DL transmission is at least partly within a third frequency range different from the first frequency range; and in response to the second determination, transmitting the additional data at a time different from the second time of DL transmission.

R: The method according to any of paragraphs K-Q, the method performed by the telecommunication terminal comprising any of the elements listed in any of paragraphs one through ten.

S: The method according to any of paragraphs K-R, further comprising, by the telecommunication terminal, making the determination at least partly by determining the frequency combination as an intermodulation distortion (IMD) product of the first and second frequencies of DL transmission.

T: At least one tangible, non-transitory computer-readable medium storing instructions executable by at least one processor to cause the at least one processor to perform operations comprising: receiving first data to be transmitted; receiving a first downlink (DL) grant record indicating a first frequency of DL transmission in a first frequency range and associated with a time of DL transmission; receiving a second DL grant record indicating a second frequency of DL transmission in the first frequency range and associated with the time of DL transmission; making a determination that a frequency combination of the first frequency of DL transmission and the second frequency of DL transmission is at least partly within a second frequency range different from the first frequency range; and in response to the determination, transmitting the first data via a cellular network at a time different from the time of DL transmission.

U: The at least one tangible, non-transitory computer-readable medium as recited in paragraph T, the operations comprising: receiving an uplink (UL) grant record associated with the second frequency range and with the time of DL transmission; and in response to the UL grant record and to the determination, scheduling the first data for transmission during a time different from the time of DL transmission.

V: The at least one tangible, non-transitory computer-readable medium as recited in paragraph T or U, the operations comprising, after receiving the first data, and in response to the determination, transmitting a UL scheduling request at a time that is: earlier than a time of transmitting the first data; and different from the time of DL transmission.

W: The at least one tangible, non-transitory computer-readable medium as recited in any of paragraphs T-V, the operations comprising: receiving second data to be transmitted, the second data associated with a guaranteed bit-rate (GBR) data flow; transmitting the first data via a first access network, wherein the first data is associated with a non-guaranteed-bit-rate (non-GBR) data flow; and transmitting the second data via a second access network at least partly during the time of DL transmission.

X: The at least one tangible, non-transitory computer-readable medium as recited in any of paragraphs T-W, the operations comprising: retrieving, from predetermined conflict data, a conflict flag associated with both the first frequency of DL transmission and the second frequency of DL transmission; and making the determination in response to the conflict flag indicating that the first frequency of DL transmission and the second frequency of DL transmission are associated with an inter-band conflict.

Y: The at least one tangible, non-transitory computer-readable medium as recited in any of paragraphs T-X, the operations for receiving or transmitting comprising doing so via a communications interface configured to communicate via a cellular network.

Z: The at least one tangible, non-transitory computer-readable medium as recited in any of paragraphs T-Y, the operations further comprising making the determination at least partly by determining the frequency combination as an intermodulation distortion (IMD) product of the first and second frequencies of DL transmission.

AA: A device comprising: a processor; and a computer-readable medium, e.g., a computer storage medium, having thereon computer-executable instructions, the computer-executable instructions upon execution by the processor configuring the device to perform operations as any of paragraphs A-J, K-S, or T-Z recites.

AB: A computer-readable medium, e.g., a computer storage medium, having thereon computer-executable instructions, the computer-executable instructions upon execution configuring a computer to perform operations as any of paragraphs A-J, K-S, or T-Z recites.

AC: A system comprising: means for processing; and means for storing having thereon computer—executable instructions, the computer—executable instructions including means to configure the system to carry out a method as any of paragraphs A-J, K-S, or T-Z recites.

AD: A telecommunication terminal configured to perform operations as any of paragraphs A-J, K-S, or T-Z recites.

AE: A method comprising performing operations as any of paragraphs A-J, K-S, or T-Z recites.

CONCLUSION

Various examples are described with reference to VoLTE. However, this is not limiting. Techniques herein can be used to prioritize any streaming or latency-sensitive traffic, e.g., video calls or real-time-gaming event data. Various examples describe transmitting only on LTE during conflict time periods to mitigate IMD. Other examples include transmitting only on NR, and not on LTE, to mitigate IMD and improve transmission of latency-sensitive UL traffic being carried on NR. For example, the roles of LTE and NR can be exchanged in any embodiment herein to provide a respective additional embodiment. Moreover, techniques herein can be used with other RAN pairs than LTE and NR, e.g., LTE+LTE, NR+NR, or other grant-based cellular systems. A technical effect of at least some of these examples is to reduce packet loss in uplink, thereby improving quality of VoLTE or other streaming media sessions.

Many variations and modifications can be made to the above-described examples, the elements of which are to be understood as being among other acceptable examples. All such modifications and variations are intended to be included herein within the scope of this disclosure and protected by the claims. Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

Although some features and examples herein have been described in language specific to structural features or methodological steps, it is to be understood that the subject matter herein is not necessarily limited to the specific features or steps described. For example, the operations of example processes herein are illustrated in individual blocks and logical flows thereof, and are summarized with reference to those blocks. The order in which the operations are described is not intended to be construed as a limitation unless otherwise indicated (regardless of how any other group of operations is described), and any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

The methods, processes, or operations described above can be embodied in, and fully automated via, hardware, firmware, or software code modules executed by one or more computers or processors. As used herein, the term "module" is intended to represent example divisions of the described operations (e.g., implemented in software, firmware, or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem. Generally, computer-executable instructions include routines, programs, objects, modules, code segments, components, data structures, and the like that perform particular functions or implement particular abstract data types.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more processors 214, such as one or more internal or external CPUs or GPUs, or one or more pieces of hardware logic such as FPGAs, DSPs, or other types of accelerators.

Various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements, or steps. Thus, such conditional language is not generally intended to imply that certain features, elements, or steps are in any way required for one or more examples or that one or more examples necessarily include logic for deciding, with or without user input or prompting, whether certain features, elements, or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A telecommunication terminal, comprising:
   a communications interface configured to communicate with a cellular network;
   a memory storing conflict data; and
   a control unit communicatively connected with the communications interface and the memory, and configured to perform operations comprising:
      receiving first data to be transmitted;
      receiving, via the communications interface, an uplink (UL) grant record associated with a time of permitted UL transmission;
      receiving, via the communications interface, two downlink (DL) grant records, each indicating a respective frequency of DL transmission and associated with a respective time of a respective DL transmission;
      determining that the respective times of DL transmission at least partly overlap with the time of UL transmission;
      determining, based on the conflict data, that the respective frequencies of DL transmission are associated with an inter-band conflict; and
      in response, transmitting the first data at a time later than the time of permitted UL transmission.

2. The telecommunication terminal according to claim 1, wherein:
   the UL grant record is associated with a first access network;
   the two DL grant records are associated with a second, different access network; and
   the communications interface is configured to communicate concurrently via the first access network and via the second access network.

3. The telecommunication terminal according to claim 2, the operations further comprising:
   receiving second data to be transmitted;
   receiving a second UL grant record associated with the time of permitted UL transmission and with the second access network; and
   transmitting the second data during the time of permitted UL transmission.

4. The telecommunication terminal according to claim 3, wherein:
   the first access network comprises a Third-Generation Partnership Project New Radio (fifth-generation) access network;
   the second access network comprises a Long-Term Evolution (LTE) access network; and
   the second data comprises Voice-over-LTE (VoLTE) data.

5. The telecommunication terminal according to claim 1, the operations further comprising determining that the respective frequencies of DL transmission are associated with an inter-band conflict at least partly by:
   indexing into the conflict data based on the respective frequencies of the DL transmission to retrieve a conflict flag; and
   determining that the conflict flag indicates that the respective frequencies of DL transmission are associated with an inter-band conflict.

6. The telecommunication terminal according to claim 1, wherein:
   the conflict data comprises a plurality of first frequency ranges and a plurality of second frequency ranges;
   each of the first frequency ranges is associated with a respective one of the second frequency ranges; and
   the operations comprise:
      determining that a first frequency of the respective frequencies of DL transmission is located in one of the first frequency ranges; and
      determining that a second frequency of the respective frequencies of DL transmission is located in the respective one of the second frequency ranges.

7. The telecommunication terminal according to claim 1, the operations comprising:
   receiving the UL grant record during a first subframe;
   determining that the time of permitted UL transmission is within a second subframe that is a predetermined number N of subframes after the first subframe, wherein N is greater than one;
   receiving at least a first DL grant record of the two DL grant records during the second subframe; and
   determining that the time of DL transmission associated with the first DL grant record is within the second subframe.

8. The telecommunication terminal according to claim 1, wherein:
   the frequencies of DL transmission are within a first frequency range;
   the UL grant is associated with a second frequency range different from the first frequency range;

the first data is associated with a non-guaranteed-bit-rate (non-GBR) data stream; and
the operations comprise:
receiving the DL grant records from a cellular-network base station;
after receiving the first data, transmitting a UL scheduling request via the communications interface to the cellular-network base station at a time different from both of the respective times of DL transmission;
determining that the respective frequencies of DL transmission are associated with the inter-band conflict at least partly by making a determination that a frequency combination of the respective frequencies of DL transmission is at least partly within the second frequency range;
scheduling the time of transmission of the first data to be later than both of the respective times of DL transmission;
receiving second data to be transmitted, the second data associated with a guaranteed bit-rate (GBR) data flow;
transmitting the first data via a first access network; and
transmitting the second data via a second, different access network at least partly during at least one of the respective times of DL transmission.

9. A method comprising, by a telecommunication terminal:
receiving first data to be transmitted;
receiving, from a cellular-network base station, a first downlink (DL) grant record indicating a first frequency of DL transmission in a first frequency range and associated with a time of DL transmission;
receiving, from the cellular-network base station, a second DL grant record indicating a second frequency of DL transmission in the first frequency range and associated with the time of DL transmission, wherein the second frequency of DL transmission is different from the first frequency of DL transmission;
making a determination that a frequency combination of the first frequency of DL transmission and the second frequency of DL transmission is at least partly within a second frequency range different from the first frequency range; and
in response to the determination, transmitting the first data at a time different from the time of DL transmission.

10. The method according to claim 9, further comprising, by the telecommunication terminal:
receiving, from the cellular-network base station, an uplink (UL) grant record associated with the second frequency range and with the time of DL transmission; and
in response to the UL grant record and to the determination, scheduling the first data for transmission during a time different from the time of DL transmission.

11. The method according to claim 9, further comprising, by the telecommunication terminal, after receiving the first data, transmitting a UL scheduling request to the cellular-network base station.

12. The method according to claim 11, further comprising, by the telecommunication terminal, in response to the determination, transmitting the UL scheduling request at a time that is:
earlier than a time of transmitting the first data; and
different from the time of DL transmission.

13. The method according to claim 9, wherein:
the first data is associated with a non-guaranteed-bit-rate (non-GBR) data flow; and
the method further comprises, by the telecommunication terminal:
receiving second data to be transmitted, the second data associated with a guaranteed bit-rate (GBR) data flow;
transmitting the first data via a first access network; and
transmitting the second data via a second access network at least partly during the time of DL transmission.

14. The method according to claim 9, further comprising, by the telecommunication terminal, making the determination at least partly by:
retrieving, from predetermined conflict data, a conflict flag associated with both the first frequency of DL transmission and the second frequency of DL transmission; and
making the determination in response to the conflict flag indicating that the first frequency of DL transmission and the second frequency of DL transmission are associated with an inter-band conflict.

15. The method according to claim 9, further comprising, by the telecommunication terminal:
receiving additional data to be transmitted;
receiving, from a cellular-network base station, a third DL grant record indicating a third frequency of DL transmission in the first frequency range and associated with a second time of DL transmission;
receiving, from the cellular-network base station, a fourth DL grant record indicating a fourth frequency of DL transmission in the first frequency range and associated with the second time of DL transmission, wherein the fourth frequency of DL transmission is different from the third frequency of DL transmission;
making a second determination that a second frequency combination of the third frequency of DL transmission and the fourth frequency of DL transmission is at least partly within a third frequency range different from the first frequency range; and
in response to the second determination, transmitting the additional data at a time different from the second time of DL transmission.

16. At least one tangible, non-transitory computer-readable medium storing instructions executable by at least one processor to cause the at least one processor to perform operations comprising:
receiving first data to be transmitted;
receiving a first downlink (DL) grant record indicating a first frequency of DL transmission in a first frequency range and associated with a time of DL transmission;
receiving a second DL grant record indicating a second frequency of DL transmission in the first frequency range and associated with the time of DL transmission;
making a determination that a frequency combination of the first frequency of DL transmission and the second frequency of DL transmission is at least partly within a second frequency range different from the first frequency range; and
in response to the determination, transmitting the first data via a cellular network at a time different from the time of DL transmission.

17. The at least one tangible, non-transitory computer-readable medium as recited in claim 16, the operations comprising:
receiving an uplink (UL) grant record associated with the second frequency range and with the time of DL transmission; and in response to the UL grant record and to the determination, scheduling the first data for transmission during a time different from the time of DL transmission.

18. The at least one tangible, non-transitory computer-readable medium as recited in claim 16, the operations comprising, after receiving the first data, and in response to the determination, transmitting a UL scheduling request at a time that is:
earlier than a time of transmitting the first data; and
different from the time of DL transmission.

19. The at least one tangible, non-transitory computer-readable medium as recited in claim 16, the operations comprising:
receiving second data to be transmitted, the second data associated with a guaranteed bit-rate (GBR) data flow;
transmitting the first data via a first access network, wherein the first data is associated with a non-guaranteed-bit-rate (non-GBR) data flow; and
transmitting the second data via a second access network at least partly during the time of DL transmission.

20. The at least one tangible, non-transitory computer-readable medium as recited in claim 16, the operations comprising:
retrieving, from predetermined conflict data, a conflict flag associated with both the first frequency of DL transmission and the second frequency of DL transmission; and
making the determination in response to the conflict flag indicating that the first frequency of DL transmission and the second frequency of DL transmission are associated with an inter-band conflict.

* * * * *